US012359702B2

(12) United States Patent
Huang et al.

(10) Patent No.: US 12,359,702 B2
(45) Date of Patent: Jul. 15, 2025

(54) LATTICE-BASED METAMATERIALS AND METHODS OF USE

(71) Applicants: Guoliang Huang, Columbia, MO (US); Hussein Nassar, Columbia, MO (US); Yangyang Chen, Columbia, MO (US); Xianchen Xu, Columbia, MO (US)

(72) Inventors: Guoliang Huang, Columbia, MO (US); Hussein Nassar, Columbia, MO (US); Yangyang Chen, Columbia, MO (US); Xianchen Xu, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 593 days.

(21) Appl. No.: 17/679,854

(22) Filed: Feb. 24, 2022

(65) Prior Publication Data

US 2022/0412422 A1  Dec. 29, 2022

Related U.S. Application Data

(60) Provisional application No. 63/153,004, filed on Feb. 24, 2021.

(51) Int. Cl.
F16F 3/02 (2006.01)
B33Y 50/00 (2015.01)
B33Y 80/00 (2015.01)

(52) U.S. Cl.
CPC ............... F16F 3/02 (2013.01); B33Y 50/00 (2014.12); B33Y 80/00 (2014.12); F16F 2228/066 (2013.01); F16F 2234/00 (2013.01)

(58) Field of Classification Search
CPC .... F16F 3/02; F16F 2228/066; F16F 2234/00; F16F 7/00; B33Y 50/00; B33Y 80/00; B60C 7/14
See application file for complete search history.

(56) References Cited

U.S. PATENT DOCUMENTS 10,808,794 B1 * 10/2020 Boyce ..................... F16F 15/02
2022/0013098 A1 * 1/2022 Dede ...................... G10K 11/30
2022/0405445 A1 * 12/2022 Bonfanti ................. G06F 30/23

OTHER PUBLICATIONS

WO document No. WO 2012/151472 to Koh et al published on Nov. 8, 2012.*

(Continued)

Primary Examiner — Pamela Rodriguez
(74) Attorney, Agent, or Firm — Sandberg Phoenix & von Gontard, P.C.

(57) ABSTRACT

An elastic wave cloaking lattice-based metamaterial for cloaking an object within a void includes a lattice of connected unit cells arranged to form a void, each unit cell comprising a mass and a plurality of connecting springs, the mass coupled by the plurality of connecting springs to masses in adjacent unit cells, the plurality of connecting springs comprising at least two large springs of a first length and at least two short springs of a second length, the first length greater than the second length, the springs and masses having relational and mechanical characteristics to facilitate elastic wave cloaking in the totality of the lattice. The lattice as a whole has metamaterial properties resulting from the positional relationship and mechanical properties of masses and connecting springs of the unit cells such that the lattice at least partially cloaks an object or material portioned within the void from elastic waves.

6 Claims, 21 Drawing Sheets

(56) References Cited

OTHER PUBLICATIONS

WO document No. WO 2014/140538 to Daley et al published on Sep. 18, 2014.*
WO document No. WO 2018/001234 to Ma et al published on Jan. 4, 2018.*
WO document No. WO 2020/264146 to Wu et al published on Dec. 30, 2020.*

* cited by examiner

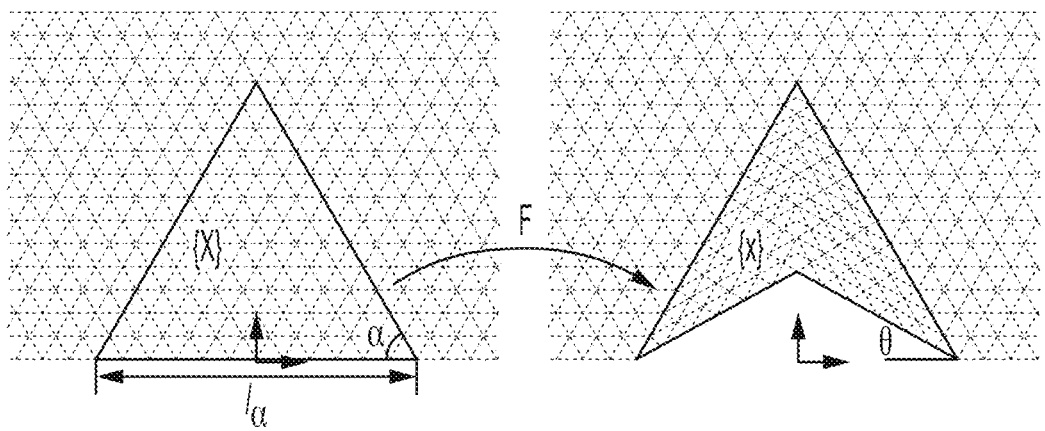
FIG. 3A
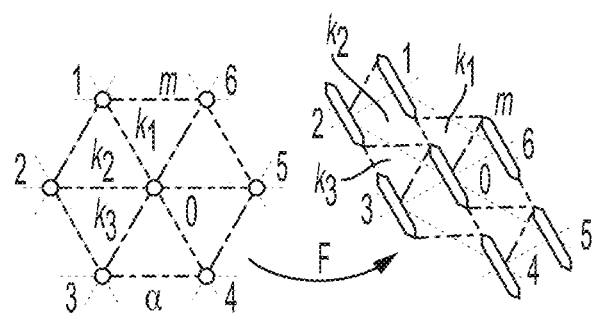 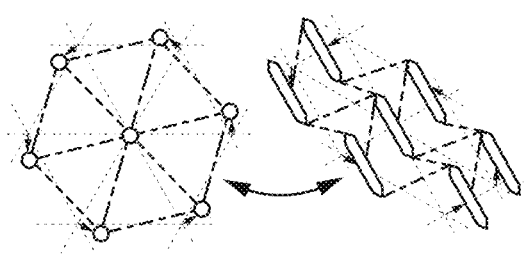
FIG. 3B          FIG. 3C

LATTICE-BASED METAMATERIALS AND METHODS OF USE

CROSS-REFERENCE TO RELATED APPLICATIONS

This application claims the benefit of U.S. Provisional Application No. 63/153,004, filed Feb. 24, 2021, the entirety of which is hereby incorporated by reference.

GOVERNMENT RIGHTS

This invention was made with government support under W911 NF-18-1-0031 awarded by the Army Research Office. The government has certain rights in the invention.

FIELD

The present teachings relate to the utilization of metamaterials for flexible materials to protect buildings.

BACKGROUND

An elastic cloak is a coating material that can be applied to an arbitrary inclusion to make it indistinguishable from the background medium. Cloaking against elastic disturbances, in particular, has been demonstrated using several designs and gauges. None, however, tolerate the coexistence of normal and shear stresses due to a shortage of physical realization of transformation-invariant elastic materials.

SUMMARY

In the present disclosure, this limitation to design is overcome and a new class of polar materials is fabricated with a distribution of body torque that exhibits asymmetric stresses. A static cloak for full two-dimensional elasticity is thus constructed based on the transformation method. The proposed cloak is made of a functionally graded multi-layered lattice embedded in an isotropic continuum background. While one layer is tailored to produce a target elastic behavior, the other layers impose a set of kinematic constraints equivalent to a distribution of body torque that breaks the stress symmetry. Experimental testing under static compressive and shear loads demonstrate encouraging cloaking performance in good agreement with our theoretical prediction. The work sets a precedent in the field of transformation elasticity and should find applications in mechanical stress shielding and stealth technologies.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way. The figures exemplarily illustrate the invention as described below in accordance with various embodiments. Corresponding reference numerals indicate corresponding parts throughout the several views of drawings.

FIG. 3 illustrates a schematic design of the discrete mass-spring polar lattice for a carpet cloak.

Figure 20A:
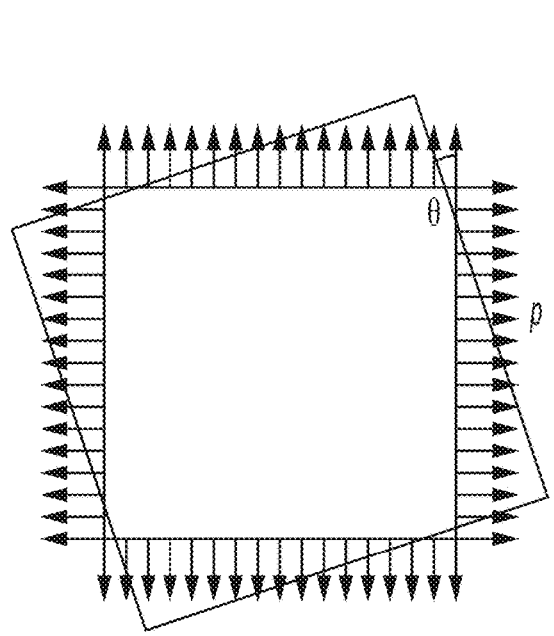
Figure 20B:
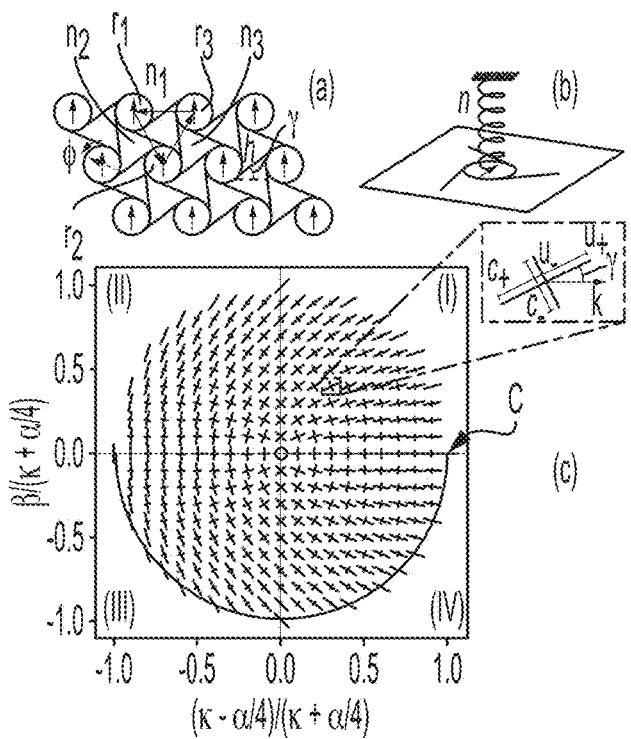

FIG. 20 schematically illustrates polar solids exhibiting chiral and handedness effects while remaining isotropic and the coupling between dilation and rotation that precludes purely longitudinal and transverse wave propagation.

Figure 21:
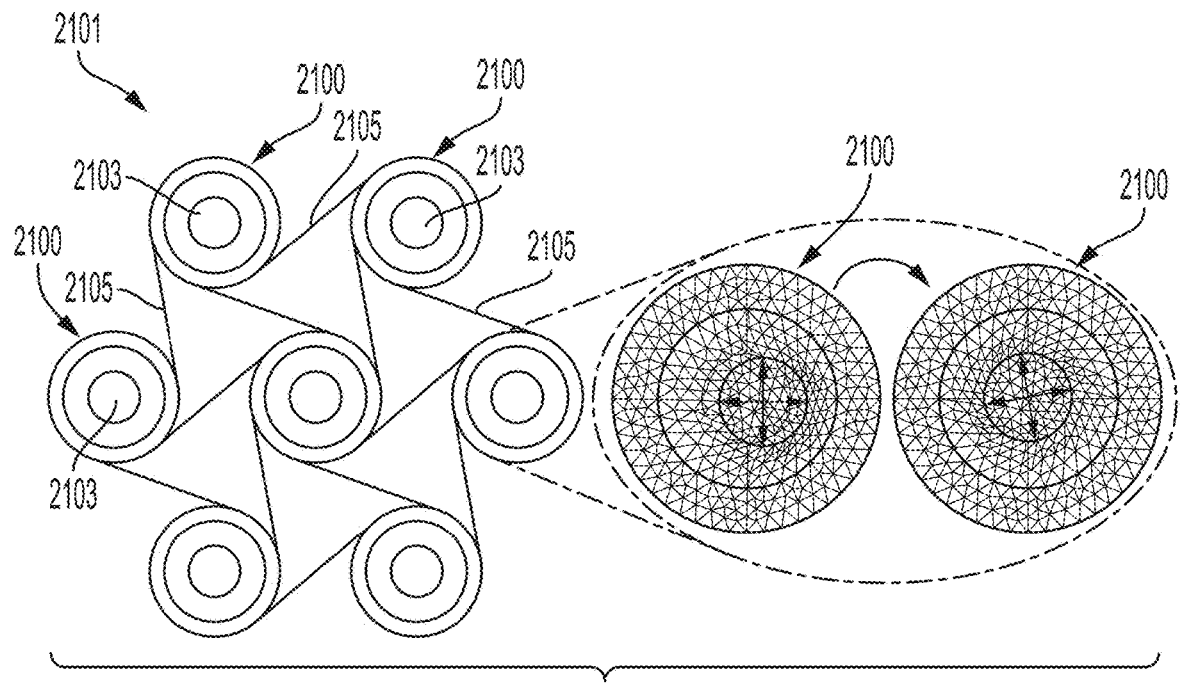

FIG. 21 schematically illustrates a polar metamaterial, based on rotational resonance, with no strings attached designed as a passive solution for elastic cloaking.

Figure 22:
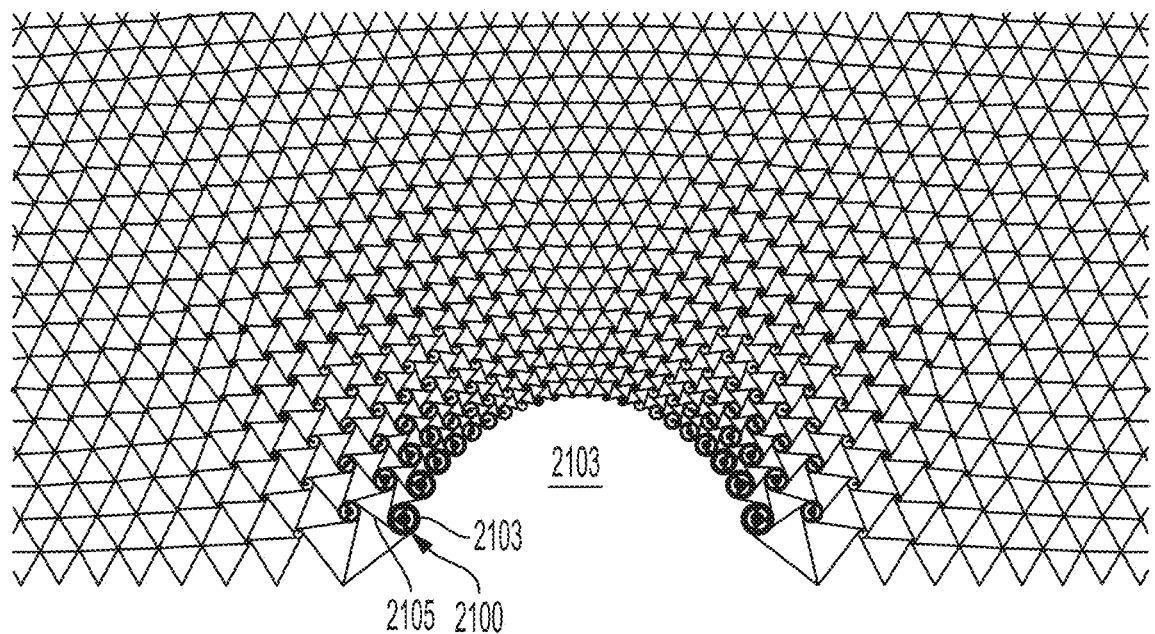

FIG. 22 schematically illustrates a carpet cloak under which an object can be cloaked using the polar metamaterial (s) described throughout.

Figure 23:
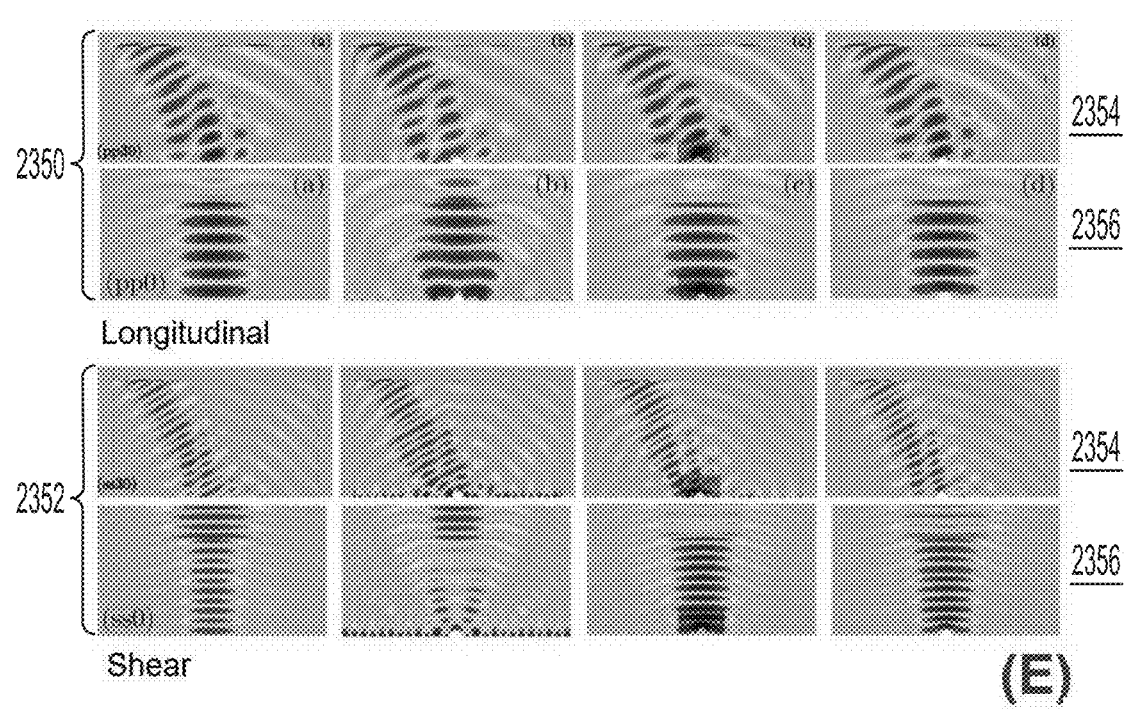

FIG. 23 illustrates numerical simulation of the metamaterial cloak.

Figure 24:
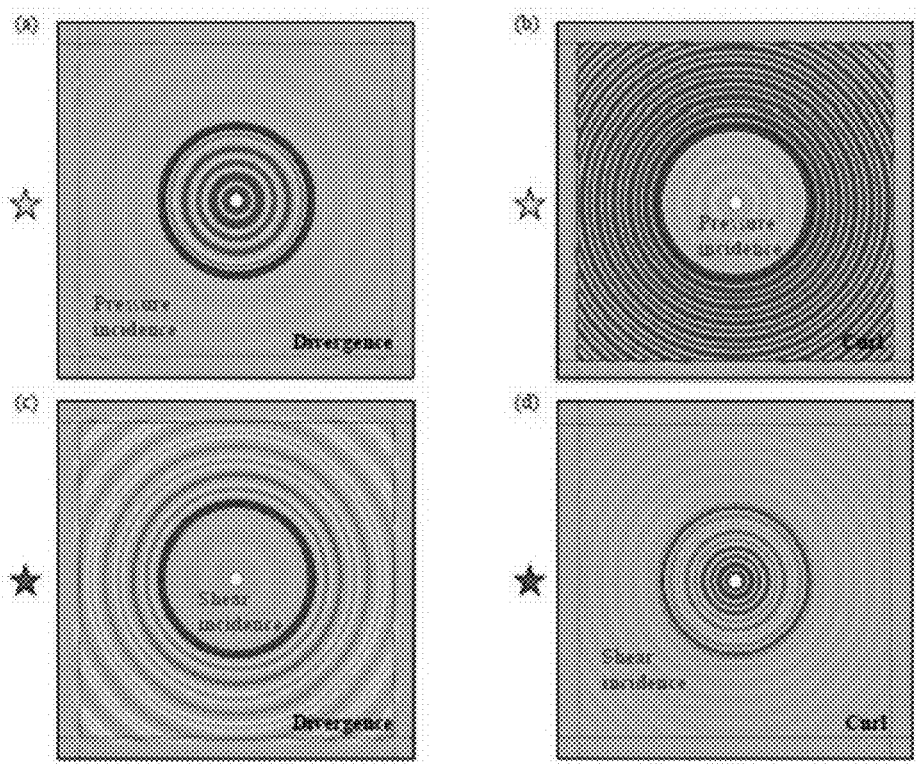

FIG. 24 illustrates, using the cloaking metamaterials described throughout, an isotropic polar platform that can support omnidirectional polarization where shear waves propagate faster with larger phase velocity than longitudinal waves.

Figure 25:
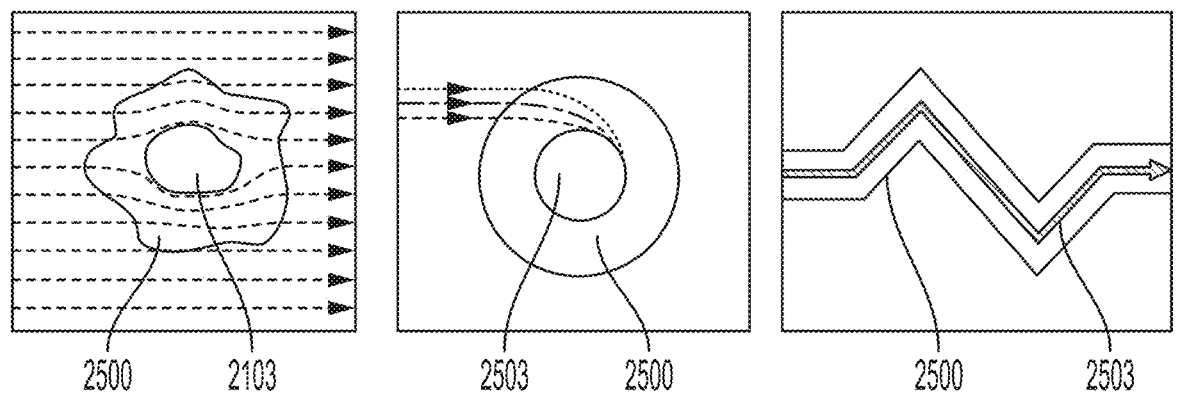

FIG. 25 illustrates applications for using the cloaking metamaterials described throughout.

Figure 26:
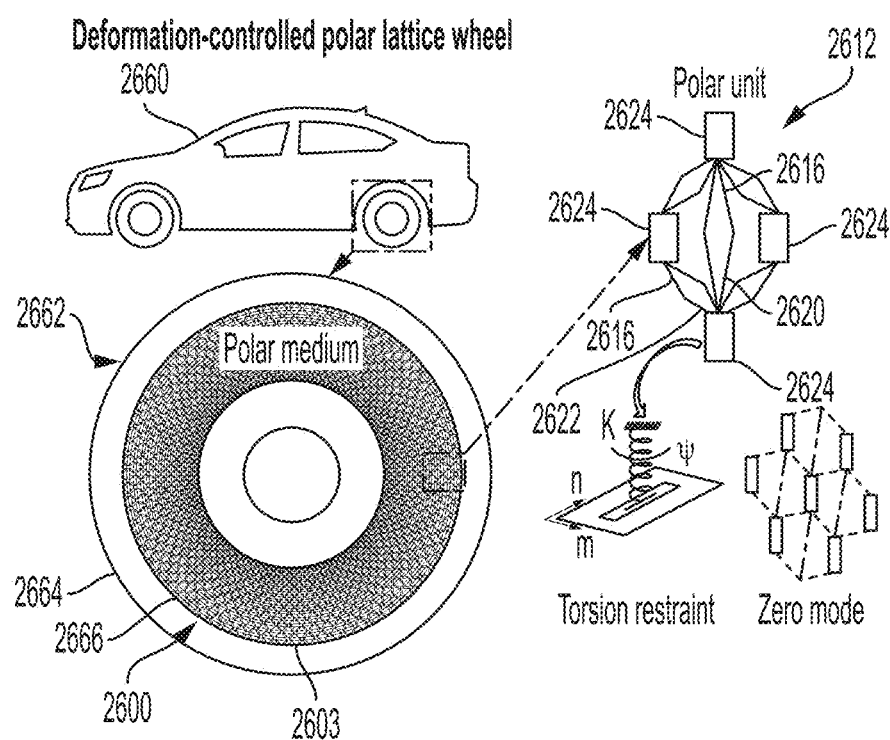

FIG. 26 illustrates a specific application of the cloaking metamaterials described throughout for use with a wheel of a vehicle.

Figure 27:
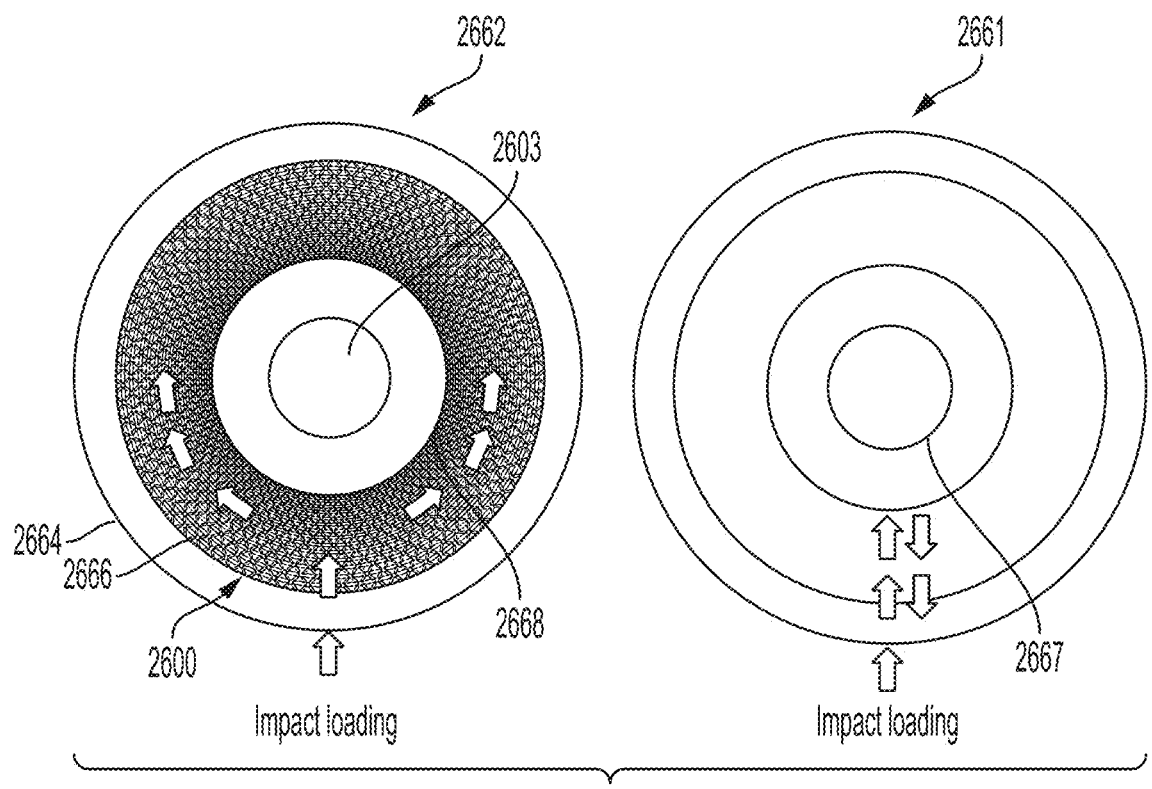

FIG. 27 is a schematic illustration comparing impact loading of a wheel incorporating the cloaking metamaterials disclosed throughout to a traditional wheel.

Figure 28:
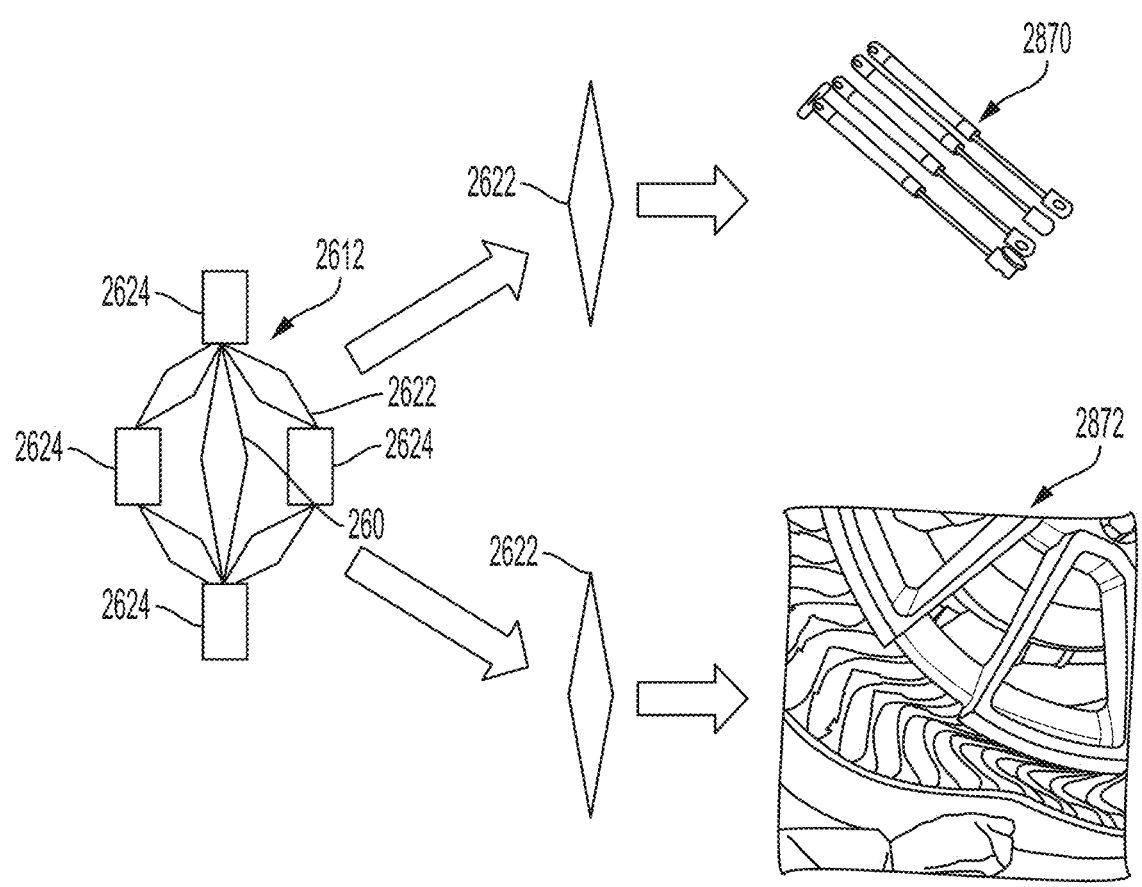

FIG. 28 is a schematic illustration of a metamaterial cell according to this disclosure that can be used in vehicle damper or wheel applications.

Figure 29:
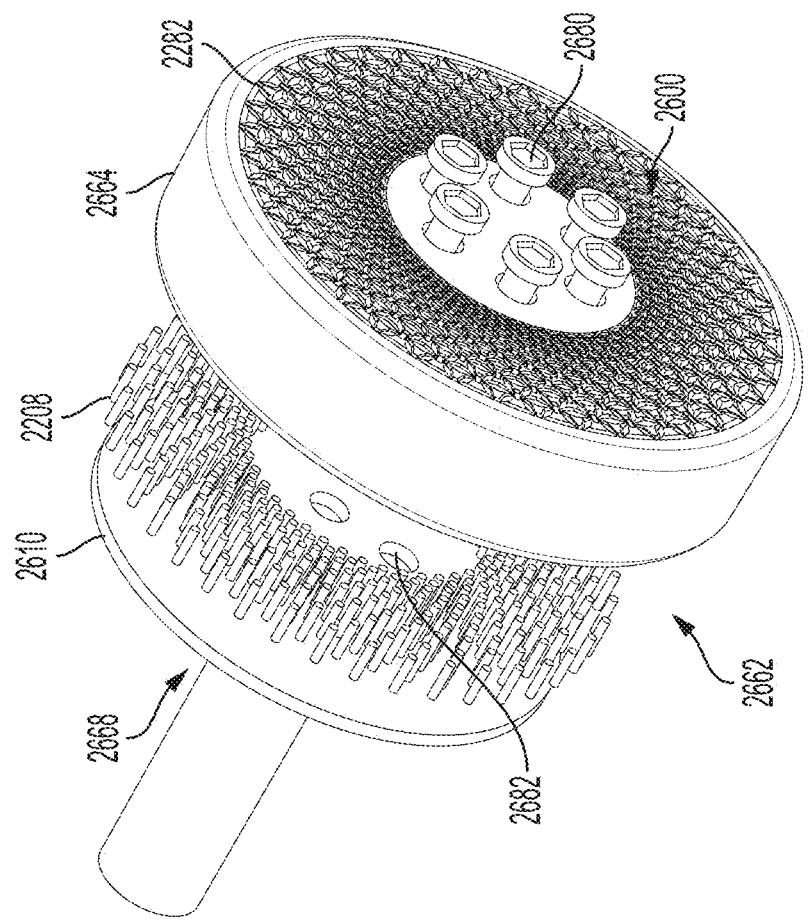

FIG. 29 is an exploded view of the wheel of FIG. 27 according to one embodiment.

Figure 30:
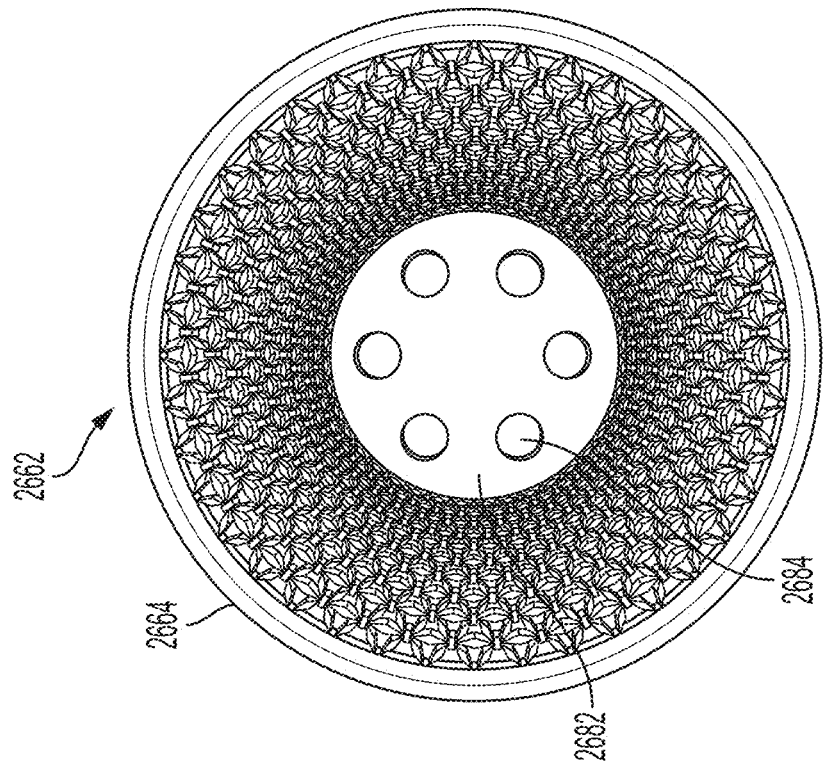

FIG. 30 is a side view of the wheel of FIG. 29.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting. Begin Design Paper Referring generally to FIGS. 1-28, the theory of composites, broadly defined, continues to inform design procedures for artificial materials (e.g., including elastic cloaks of the type described herein). An important thematic problem in that context is how to design materials with target elastic properties out of a limited number of elastic phases, with specific volume fractions, and using certain fabrication processes, e.g., mixing, layering, or three-dimensional ("3D") printing (e.g., fused deposition modeling, selective laser sintering, etc.). The advent of metamaterials has presented the theory of composites with new challenges where the target properties are unusual in the sense that they break certain conventional symmetries of the constitutive law, e.g., the minor symmetries of Hooke's law. Most relevant to the design and cloaks described herein is the way in which such properties arise in the context of the transformation method where they allow to space-warp solution fields. In transformation acoustics, for instance, the design of acoustic "invisible" cloaks naturally calls for the use of "anisotropic fluid", i.e., acoustic media where stress is not necessarily hydrostatic. Anisotropic fluids can be 3D printed out of a single solid phase in a lattice form. In that case, anisotropic fluids are better known as "pentamode materials." In transformation elasticity on the other hand, anisotropy is not enough, and a general space-warping transformation, namely a curvilinear change of coordinates, modifies Hooke's law into a different nonstandard constitutive law. The specific form of the modified law depends on the "gauge" adopted in the change of coordinates. In the Milton-Brian-Willis gauge, the modified law is of the Willis type: it exhibits symmetric stresses but couples stresses to velocities. On the other hand, in the Brun-Guenneau-Movchan gauge, the law exhibits a nonstandard elasticity tensor c with polar (i.e., lacking minor symmetry $c_{ijkl} \neq c_{jikl}$) and, in some cases, chiral (i.e., lacking mirror symmetry) components. This observation begs the question of how to design elastic lattice metamaterials with targeted anisotropic, polar, and chiral elasticity tensors. In this disclosure, that question is answered for a wide range of materials in two space dimensions and a suitable method of design is explained.

Lattice metamaterials, including pentamodes and the kind of architected materials described herein, are a class of artificial cellular materials made out of interconnected beam elements organized at different scales to precisely tailor material properties. Such lattice materials have applications that extend beyond the realm of cloaking as primarily described herein and for which the methods of design described herein are also applicable; in particular, they provide designs for lightweight structures, bone replacements, energy absorbers, nanomaterials with ultrahigh strength, damage tolerance, of other multifunctional materials. Lattice metamaterials are, in a sense, universal for the realization of extreme and unusual properties. Pentamodes provide for any elasticity tensor can be realized with an appropriate mixture of lattice materials. In general, some mixtures are highly intricate and involve several interpenetrating lattices making them impractical. The method of design and the metamaterials described herein solve such problems. For example, using the design techniques described herein, a single lattice can be sufficient to achieve the desired properties. This can be the case for pentamodes in transformation acoustics. As described herein, and using the design techniques described herein, transformed elastic materials can be fashioned out of single-lattice metamaterials and using an inverse design starting from the desired properties and resulting in 3D-printable architectures.

The desired elasticity tensors c in transformation elasticity are a function of two parameters: (i) the elasticity tensor C of a standard reference medium, i.e., before applying any geometric transformations; and, (ii) the gradient F of a space-warping transformation #which maps the reference medium to a physical space. Elastic cloaks can be designed by developing polar elastic lattices convenient for two particular classes of transformations, (i) that of conformal trans-formations P where F is shear-free (i.e., proportional to a rotation); and (ii) that of radially symmetric P where F is rotation-free. In the preferred embodiment, the design method holds for arbitrary transformation gradients F combining nonuniform stretch, shear, and rotation and permits to realize anisotropic materials with polar and chiral properties. The key design consideration is to let F operate, not only on the elastic properties to change them from C to c, but on the underlying architectures themselves as well. In other words, instead of looking for architectures with the unusual tensor c, in this design method the designer first targets the architectures of the background medium with the conventional tensor C. The found architectures are then transformed by F into a lattice material which automatically exhibits the sought-after tensor c. The transformation rules according to which F operates on a lattice material to generate another lattice material constitute what will be further refer to as "Discrete Transformation Elasticity". Other direct lattice transformations considered ignore the polar character of the required tensors. In the design method described herein, at least this problem in the framework of polar elasticity is solved and the disclosed design method provides feasible designs based on rigorous derivations taking into account the full tensorial character of the equations of elasticity that can be anisotropic, polar, and chiral simultaneously. As an outstanding application, we leverage the proposed design paradigm to construct a polar lattice metamaterial for the observation of elastic carpet cloaking and/or other applications. Numerical simulations have been conducted and show excellent cloaking performance under shear and pressure, static and dynamic loads.

Figure 1:
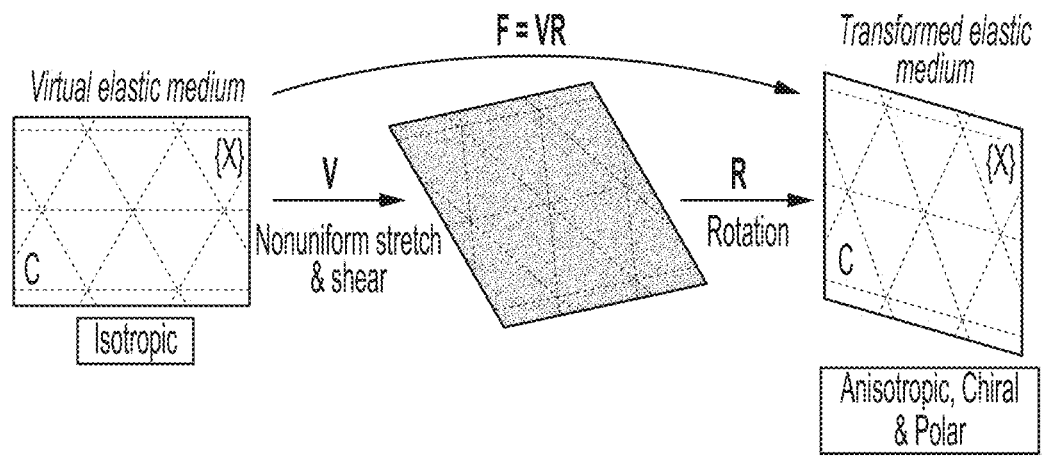
FIG. 1 is a schematic representation of continuum transformation elasticity.

To understand the design method disclosed herein, first consider a general mapping $x=\phi(X)$ that transforms a virtual (original) domain $\{X\}$ into a physical (transformed) domain $\{x\}$ as shown in FIG. 1. FIG. 1 is schematic representation of continuum transformation elasticity. A continuum elastic medium with the elastic tensor C occupies the virtual space $\{X\}$. A transformed elastic medium with the elastic tensor c occupies the physical space $\{x\}$. The transformation gradient F comprises nonuniform stretch, shear, and rotation. When the virtual elastic medium is isotropic, the resulted transformed elastic medium is anisotropic, chiral, and polar. Referring to the design method and FIG. 1, the transformation (can encompass any combinations of stretch, shear, and rotation. Thus, the transformation gradient F will generally decompose into F=VR where R is orthogonal (rotation tensor) and V is symmetric positive definite (stretch tensor), as shown in FIG. 1. The virtual and physical domains are occupied by elastic media which, under an external load, are displaced by fields U(X) and u(x), respectively. The design method determines the constitutive properties of $\{x\}$, or even its microstructure, that let the displacement field be warped according to the same transformation $\phi$, that is, $U(X)=u(x)=u(\phi(X))$. To do so, it is particularly insightful to interpret the fields u(x) and U(X) as two different, but equivalent, sets of generalized Lagrangian coordinates, namely such that:

$$\int_{\{X\}} L(\nabla U) dX = \int_{\{x\}} \ell(\nabla u) dx$$

where L and l are the strain energy densities over $\{X\}$ and $\{x\}$, respectively. The change of coordinates formula, together with the chain rule, then yields $l(\nabla u)=L(\nabla uF)/J$ with $F=dx/dX$ and $J=\nabla F$ being the transformation gradient and its determinant. Note that the above equation is valid for any sets of coordinate transformations $\{X\} \to \{x\}$. Accordingly, it is possible to warp the displacement field from U(X) to u(x) as long as $\{x\}$ is composed of materials with the prescribed strain energy l. In terms of the constitutive properties, when the original domain $\{X\}$ has an elasticity tensor C, the transformed domain $\{x\}$ has an elasticity tensor c with $c_{ijkl}=F_{jm}F_{in}C_{imkn}/J$. A close inspection of the foregoing relation shows that the transformed elasticity tensor c is unconventional in at least three regards: (i) it is polar in the sense that it lacks the minor symmetry; (ii) it is degenerate in the sense that it admits a number of zero modes; and (iii) it is chiral in the sense that it lacks mirror symmetry (in 2D). Natural materials with such unusual properties are unavailable and thus a lattice-based design is used. This has significantly impeded progress in transformation elasticity in comparison to its optics or acoustics counterpart.

Figure 2:
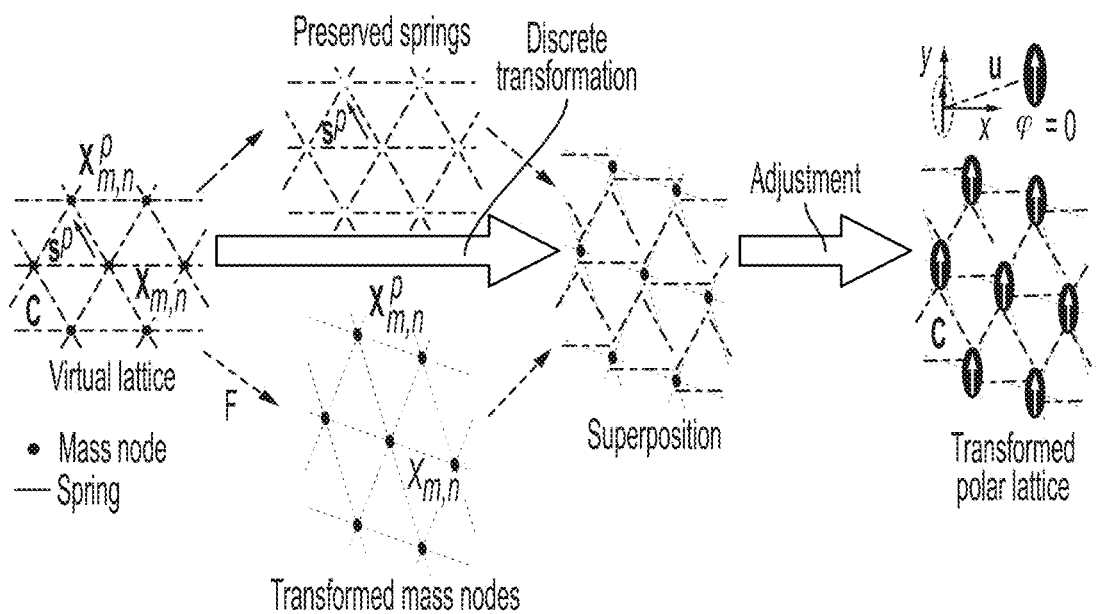
FIG. 2 is a schematic representation of discrete transformation elasticity.
Figure 4A:
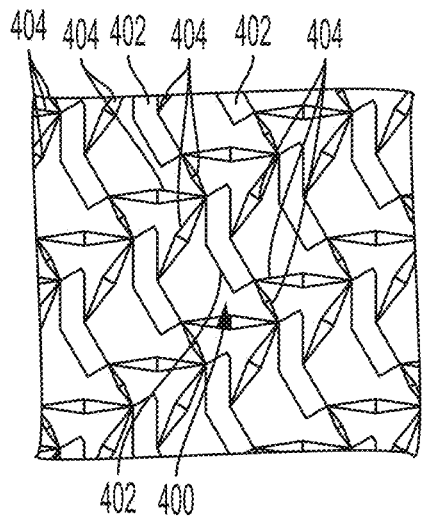
FIG. 4 illustrates a microstructure realization of a lattice-based polar metamaterial.
Figure 4B:
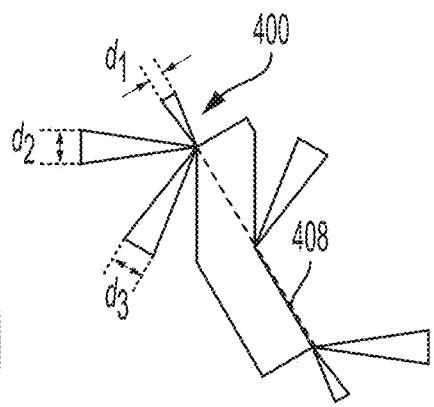
Figure 4C:
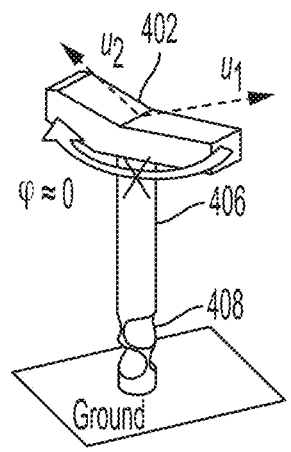
Figure 4D:
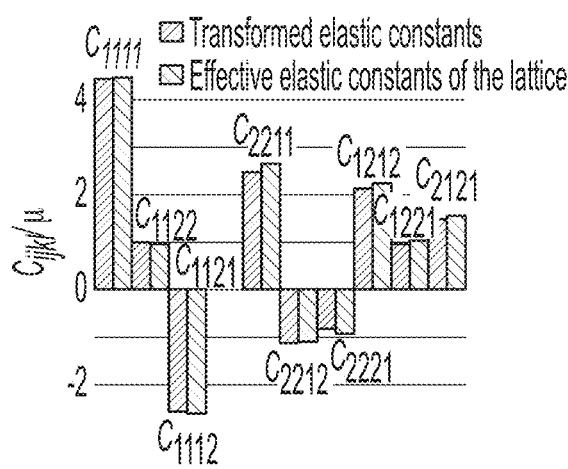
Figure 4E:
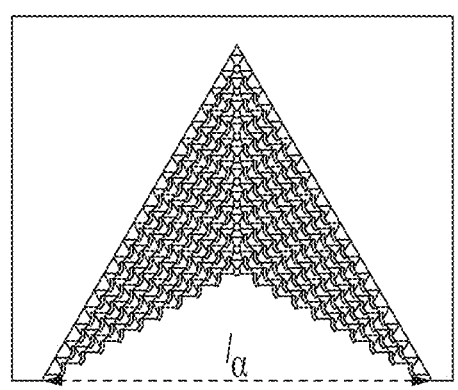

In the design method herein, the material design problem is solved by fully embracing a discrete lattice-based transformation as shown in FIG. 2. Thus, we discretize L and e as if they represented the strain energy densities of two lattices. We suppose then that the background medium is made out of a periodic lattice, or at least that it has the same elasticity tensor as such a lattice. The lattice is made of a set of massless springs connecting mass nodes as shown in FIG. 2. FIG. 2 is a schematic representation of discrete transformation elasticity. A virtual lattice with springs connected to mass nodes is characterized by effective modulus C. During the discrete transformation, mass nodes are transformed to new locations following F, while springs maintains their original directions. The transformed lattice is initially misaligned and does not contact. The final transformed polar lattice is constructed by adjusting masses and springs to ensure contact and, at the same time, suppressing rotations of the masses. Referring again to the design method and FIG. 2, because the lattice is made of a set of massless springs connecting mass n, the design method sets $$L(\nabla U) = \frac{1}{2} \sum_{m,n,p} K^p \langle \nabla U(X_{m,n}^p - X_{m,n}), S^p \rangle^2 / A_0$$

to be the strain energy per unit cell area $A_0$ of a set of springs (index p) of constants $K_p$ and of direction $$S^p = \frac{X_{m,n}^p - X_{m,n}}{\|X_{m,n}^p - X_{m,n}\|}$$

connecting node $X_{m,n}$ of a given cell (index m, n) to its neighboring nodes $X_{m,n}^p$. Then, per the above identity relating L and l, domain $\{x\}$ will have the same behavior as a lattice whose strain energy is $$\ell(\nabla u) = \frac{1}{2} \sum_{m,n,p} k^p \langle \nabla u(x_{m,n}^p - x_{m,n}), s^p \rangle^2 / a_0$$

with $(x_{m,n}^p - x_{m,n}) = F(X_{m,n}^p - X_{m,n})$, $a_0 = A_0 J$, $kV = K^p$ and $s^p = S^p$. In other words, the lattice of $\{x\}$ can be deduced from that of $\{X\}$ by (i) applying the transformation gradient F to the nodes of the lattice (as shown in FIG. 2) while (ii) leaving the springs constants and directions, as they were (as shown in FIG. 2). In particular, note that the lattice vectors anchored at the nodes, such as $X_{m,n}^p - X_{m,n}$, and the spring orientation $S^p$ do not transform in the same fashion; indeed $$s^p \neq \frac{x_{m,n}^p - x_{m,n}}{\|x_{m,n}^p - x_{m,n}\|}.$$

Last, to maintain physical contact between the mass nodes and the misaligned springs, the mass nodes must assume a finite size and become rigid bodies (see the transformed polar lattice in FIG. 2). This has the unintended effect of introducing an extra rotational degree of freedom which must be suppressed using an external ground or other rotational resonant substructures. Together, the misalignment and the suppressed rotations, are responsible for the unconventional properties of the transformed tensor c. It is also important here to stress that the original domain {X} need not be a lattice, and only to behave like one. In particular, all isotropic materials with a Poisson's coefficient equal to ⅓ behave like a triangular truss and can therefore be transformed in this fashion. More generally, square, rectangular, and oblique lattices with anisotropic effective tensors C can be transformed in the same manner. Conversely, the availability of a lattice representation of the original domain is the only limitation weighing on this approach.

Given that the behavior post-transformation exhibits asymmetric stresses, it would be tempting to describe it in the general context of micropolar elasticity. This is uncalled for however for two main reasons: on one hand, the original medium is a classical (Cauchy) continuum and therefore should transfer no couple stresses to the cloaked domain. On the other hand, the extra degrees of freedom of a micropolar medium, namely microrotations, do not appear in the strain energy density l. Accordingly, the transformed domain remains of Cauchy type, with a single stress measure, albeit an asymmetric one, and a single, again asymmetric, strain measure. The asymmetry can be explained by recalling Cauchy's second law of motion, $\sigma_{ij} - \sigma_{ji} = e_{ij}c_k$, namely that skew stresses are acceptable as long as they are in balance with an appropriate torque density. This torque density is exactly what impedes mass rotation in the designs of the design method disclosed herein. Simply, rather than them being constant, the torques are proportional to the applied strain. Cauchy elasticity augmented with torques that are proportional to strain constitutes what we refer to as "polar elasticity." It is when the original medium itself is micropolar that one needs to consider how micro-rotations and couple-stresses transform.

In view of the foregoing, a polar lattice for elastic carpet cloaking and the design thereof can now be described. Having introduced the continuous and discrete versions of transformation elasticity, the usefulness of the suggested design paradigm and method in the design of polar lattices displaying nonstandard elastic properties never realized before can be illustrated. The design method can achieve constructing an elastic carpet cloak with material properties that are uniform in space; this can be very advantageous from a manufacturing point of view. With that in mind and referring now to FIG. 3, a geometric transformation is applied that linearly compresses a triangular domain in the virtual space (shaded area in part a, left) into a concave polygon in the physical domain (shaded area in part a, right). FIG. 3 illustrates the design of the discrete mass-spring polar lattice for a carpet cloak. Part a shows a geometric transformation for realizing a carpet cloak concealing a triangular void. Part b shows a mass-spring lattice designed using the discrete transformation disclosed herein (e.g., and immediately following). For the design, a=60°, and the lengths of the springs $k_1$, $k_2$, $k_3$, and the rigid masses are $$a\left[1 - \frac{2\sqrt{3}}{3}\tan(\theta)\right], a\left[1 - \frac{\sqrt{3}}{3}\tan(\theta)\right],$$

$$\alpha\left[1 - \frac{\sqrt{3}}{3}\tan(\theta)\right], \text{ and } \frac{2\sqrt{3}a}{3}\tan(\theta),$$

respectively. Part c shows a zero-mode of the transformed lattice that is equivalent to the rigid rotation of the virtual lattice. Referring again to the design method and to FIG. 3, the geometric transformation leaves a void along the lower boundary where an object can be concealed; the other boundaries remain unchanged (as shown in FIG. 3, part a). Formally, the transformation P reads $$x = X, \quad y = \frac{\tan(\alpha) - \tan(\theta)}{\tan(\alpha)} Y + [1_a - \text{sgn}(x)x]\tan(\theta),$$

where $\alpha$, $\theta$ and $1_a$ are two angles and a length characterizing the triangular domain and void pre- and post-transformation and are shown in FIG. 3 part a. According to the method the deformation gradient of (can then be obtained as $$F = \begin{bmatrix} 1 & 0 \\ -\text{sgn}(x)\tan(\theta) & 1 - \frac{\tan(\theta)}{\tan(\alpha)} \end{bmatrix}$$

The polar decomposition leads to $$V = \begin{bmatrix} p_1\cos^2(\varphi) + p_2\sin^2(\varphi) & (p_2 - p_1)\cos(\varphi)\sin(\varphi) \\ (p_2 - p_1)\cos(\varphi)\sin(\varphi) & p_2\cos^2(\varphi) - p_1\sin^2(\varphi) \end{bmatrix},$$

$R = V^{-1}F$ where $$p_{1,2} = \frac{1 + F_{21}^2 + F_{22}^2}{2} \mp \sqrt{\left(\frac{1 - F_{21}^2 - F_{22}^2}{2}\right)^2 + F_{21}^2} \text{ and}$$

$$\tan(-2\varphi) = \frac{2F_{21}}{1 - F_{21}^2 - F_{22}^2}$$

The stretch is non-isotropic, as $V_{11} \neq V_{22}$. In addition, the transformation comprises a shear deformation, since $V_{2} = V_{21} \neq 0$. Finally, the deformed grid needs to experience a rigid rotation $R \neq I$ to realize the transformation gradient F.

Assume the material in the virtual space is isotropic with Lamé parameters ($\lambda$, $\mu$) and mass density $\rho_0$. Applying the rules of transformation elasticity, the mass density and constitutive relations of the transformed material (i.e., the cloak in our context) read $$\rho = \rho_0 A,$$

$$\begin{bmatrix} \sigma_{11} \\ \sigma_{22} \\ \sigma_{12} \\ \sigma_{21} \end{bmatrix} =$$

$$\begin{bmatrix} (\lambda + 2\mu)A & \lambda & (\lambda + 2\mu)C & 0 \\ \lambda & (\lambda + 2)/A + \mu BC & (\lambda + \mu)B & \mu C \\ (\lambda + 2\mu)C & (\lambda + \mu)B & \mu/A + (\lambda + 2\mu)BC & \mu \\ 0 & \mu C & \mu & 1 \end{bmatrix} \begin{bmatrix} e_{11} \\ e_{22} \\ e_{12} \\ e_{21} \end{bmatrix}$$

where $$A = \frac{\tan(\alpha)}{\tan(\alpha) - \tan(\theta)},$$

$B = -\text{sgn}(x)\tan(\theta)$, and $C = AB$. $\rho = \rho_0 A$ indicates that the total mass of an area in the virtual space is equal to the total mass of its transformed area in the physical space. As for the right most matrix, it represents the transformed elastic tensor c. Therein, note how the properties of cloak should be anisotropic, as $c_{1111} \neq c_{2222}$ and $c_{1212} \neq c_{2121}$ due to the anisotropic stretch in the transformation. Furthermore, the transformed material needs to be chiral ($c_{1211} \neq c_{2111}$ and $c_{1222} \neq c_{2122}$), and the material is not mirror symmetric since the transformation comprises a rotation. Using the design method, a designer is able to design a "cloaking material", i.e., a medium equivalent to the transformed material, described in the above two equations, then it is possible to demonstrate a cloaking behavior for elastic waves in the physical space.

The design method now addresses the inverse problem of designing the cloaking material using discrete transformation elasticity. Hereafter, we specify the above matrix equation to the case of a reference medium with a Poisson's ratio of 1/3 ($\lambda = \mu$). Such a medium can be conveniently represented by a triangular lattice with massless springs connecting massive nodes (as shown in the left portion of FIG. 3 part b). The length of the springs is denoted by a. The spring constants ($k_2$, $k_2$, $k_3$) and mass m of the nodes can be determined from the isotropic material properties $$k_1 = k_2 = k_3 = \frac{4\mu}{\sqrt{3}} \text{ and } m = \frac{\sqrt{3}\rho_0 a^2}{2}.$$

Performing the proposed discrete transformation, mass nodes of the virtual lattice are mapped to new locations in the transformed space following the transformation $\phi$ (see points 0-6 in FIG. 3 part b before and after the transformation), and directions of the connecting springs remain as they were in the virtual lattice. To make masses and springs physically connected, we adjust the lengths of the springs (keeping their constants unchanged) as well as the sizes of the rigid masses (keeping their masses unchanged); the specific shape of the rigid masses is irrelevant. While the lattice configuration can be arbitrary in principle, avoiding overlap among masses and springs will lead to simpler and more practical designs. In the depicted design, elongated hexagonal rigid masses were selected for this benefit, and springs $k_1$ and $k_2$ were forced to the locations that transformed from $\phi$. We first connect the rigid masses on points 0 and 1 with the spring $k_1$ (see the right portion of FIG. 3 part b). By doing so, rigid masses must be in alignment with the spring $k_1$ to ensure periodicity. We then connect the rigid masses on points 0 and 2 with the spring $k_2$ (see the right portion of FIG. 3 part b). Lengths of springs and masses are consequently determined after this procedure. Finally, the spring $k_3$ is adjusted into the transformed lattice by connecting point 0 to the rigid mass on point 6. In the design, all contacts are assumed to be hinge-like (e.g., a living hinge connection), and rotations of masses are suppressed (e.g., through connection to a substrate restricting rotation of the masses as explained later herein in greater detail).

Now, the design method focuses on the homogenized elastic response of the transformed lattice. This is done to validate the prior design steps. Using the volume average approach, the effective elastic constants of the transformed spring-mass system can be analytically obtained in terms of $\theta$, $k_1$, $k_2$, and $k_3$ for $x>0$ (described in greater detail later herein) as $$\bar{c}_{1111}=\bar{A}(16k_1+k_2+k_3), \bar{c}_{1122}=\bar{A}(3k_2+\bar{B}k_3), \bar{c}_{1112}=\bar{A}(-16\tan(\theta)k_1-\sqrt{3}k_2+\bar{C}k_3), \bar{c}_{1121}=\sqrt{3}\bar{A}(-k_2+k_3), \bar{c}_{2222}=\bar{A}(9k_2+3\bar{C}^2k_3), \bar{c}_{2212}=\sqrt{3}\bar{A}(-3k_2+\bar{C}^2k_3), \bar{c}_{2221}=3\bar{A}(-\sqrt{3}k_2+\bar{C}k_3), \bar{c}_{1212}=\bar{A}(16\tan^2(\theta)k_1+3k_2+\bar{C}^2k_3, \bar{c}_{1221}=\bar{A}(3k_2+\bar{B}k_3), \bar{c}_{1111}=3\bar{A}(k_2+k_3).$$

where $$\bar{A} = \frac{1}{8\left[\sqrt{3}-\tan(\theta)\right]},$$

$\bar{B}=3-2\sqrt{3}\tan(\theta)$, and $\bar{C}=\sqrt{3}-2\tan(\theta)$. Letting the spring constants be those of the virtual lattice:

$$k_1 = k_2 = k_3 = \frac{4\mu}{\sqrt{3}}$$

and $\lambda=\mu$, the obtained effective elastic moduli in the immediately above system of equations are exactly those that appear in the transformed material parameters of the above matrix equation. Therefore, the prediction based on discrete transformation elasticity can be confirmed as valid.

Of particular note, the lattice constructed according to this design method through discrete transformation elasticity naturally admits a zero-mode $e_0=E_0F^{-1}$, where $$E_0 = \begin{bmatrix} 0 & 1 \\ -1 & 0 \end{bmatrix}.$$

Physically, the rigid rotation in the virtual lattice is transformed into a zero-mode in the transformed lattice. As shown in FIG. 3 part c, the motions on Points 1-6 are identical before (when the motion is a rigid rotation) and after (when the motion is a zero-mode) the transformation, and naturally satisfy the displacement gauge $U(X)=u(x)$ adopted in the transformation.

With design approach described, it is possible to generate a microstructure realization of the polar metamaterial designed. Informed by the transformed mass-spring lattice, the design method allows for the numerical design of a polar metamaterial to confirm the extent to which a candidate metamaterial microstructure meets the requirements of a cloaking material and is ready to be fabricated. FIG. 4 illustrates, according to one embodiment, microstructure realization of a lattice-based polar metamaterial. Part a shows the topology of the lattice metamaterial. Part b shows a unit cell 400 of the lattice metamaterial. In this particular design, a=18 mm, $\theta$=300, $d_1$=0.38 mm, and $d_2$=$d_3$=0.84 mm. The Young's modulus and Poison's ratio of the soft and hard materials are 1 GPa, 0.33, 100 GPa, and 0.33, respectively. Any suitable materials can be used. Part c shows that the hard material is connected to the ground (or other suitable substrate for restraining rotation, such as, for example, a backing plate or multi rail layer) with a rod 406 that supports near-zero rotation but nearly free in-plane translation (e.g., as discussed later herein with reference to FIGS. 9 and 12-13). Part d shows effective elastic constants of the lattice metamaterial in comparison with the desired transformed elastic constants. Part e shows a carpet cloak constructed using the lattice metamaterial, where $l_a$=360 mm. For the carpet cloaking, material parameters of the background material are selected as $\lambda=\mu=9.14$ MPa and $\rho_0$=1000 kg/m$^3$. To satisfy the mass requirement, the mass density of the hard material is assumed as $\rho_h$=7035 kg/m$^3$.

Referring now to FIG. 4 part a and FIG. 4 part b, these portions illustrate the metamaterial design using a plurality of unit cells 400, where a hard material 402 is employed for constructing rigid masses, and a soft material 404 functions as springs. The geometry of the hard material can be modified to meet the mass density requirement as long as it maintains contact with the soft material at the three points located on the dotted line 408 (additional embodiments and detailed geometries are discussed later herein). To suppress the rotational motion of each mass, we introduce a rod 406 connecting the mass to the ground or other substrate (as shown FIG. 4 part c). The rod 406, near the ground, is indented 408 to significantly reduce its bending stiffness along $u_1$ and $u_2$ directions. For example, the indented portion 408 can comprise two sections of narrowing with the narrowed portions being perpendicular to one another. The indented portion 408 is near to the ground or substrate to facilitate the bending and, in various embodiments, can be in the bottom half, bottom third, bottom 10% of the rod 406, or otherwise be near the ground (e.g., nearer the ground end of the rod 406 than the end connected to the mass 402). As a result, the rotational stiffness of the rod 106 is much greater than its bending stiffness. Therefore, rotation of the supported mass is efficiently suppressed and only in-plane translation is allowed (e.g., through a system of the type escribed later herein with reference to FIGS. 9 and 12-13). The conventional diamond-shaped (e.g., rhombus) bar 404 made of the soft material is selected to mimic the spring of the design (as shown in FIG. 4 part b), which leads to negligible bending moments at its ends when the bar twists around the mass. By varying parameters $d_1$, $d_2$, and $d_3$, we can realize different effective spring constants $k_{eff}$=$k_1$=$k_2$=$k_3$ for the transformed lattice allowing for design for various applications of the cloak.

Having selected geometric and material parameters of the metamaterial, we now determine the effective elastic constants needed for the cloaking application. We numerically calculate the effective elastic constants based on the volume average approach. In this approach of the design method, the mechanical response of the metamaterial and the effective medium is considered equivalent if the strain energy density of the former is equal to that of the latter. To obtain the effective c, ten independent numerical tests are performed for solving the ten independent components in c dictated by the major symmetry ($c_{ijkl}$=$c_{kiij}$). In each of the tests, the rotational constraint on the left bottom boundary of the mass is applied to mimic the grounded connection. Displacements are prescribed on the boundaries of the unit cell to induce different strain states. Other boundaries are left free. During the simulations, we first individually apply the four uniform strain states: two uniaxial and two shear strains ($e_{11}$, $e_{22}$, $e_{12}$, or $e_{21}$), and then apply the six mixed strains: ({$e_{11}$, $e_{22}$}, {$e_{11}$, $e_{12}$}, {$e_{11}$, $e_{21}$}, {$e_{22}$, $e_{12}$}, {$e_2$, $e_{21}$}, {$e_{12}$, $e_{21}$}). The strain energy per unit cell is numerically calculated for each of the ten cases with the plane stress hypothesis, from which the ten independent elastic constants can be retrieved. As shown in FIG. 4 part d, effective elastic constants of the lattice metamaterial (right bars) agree very well with the transformed parameters in the matrix equation above, for the mass density and constitutive relations of the transformed material, (left bars), that demonstrates the validity of the microstructure design.

Cloaking simulations can be performed based on the design. With the proposed microstructure of the lattice-based metamaterial, it is possible to construct a carpet cloak for elastic wave propagation tests (as shown in FIG. 4 part e). Since the lattice-based metamaterial is originated from the discrete transformation elasticity, the metamaterial can automatically match the transformed physical space without any geometric alterations. This procedure, therefore, provides significant advantages in building lattice topologies for transformation elasticity. The number of unit cells in the cloak is chosen sufficiently large so as to enable satisfactory cloaking performance but not too large so as to avoid impractical simulation times. In the design, we chose 19 unit cells in the bottom row of the lattice, and tessellate them row-by-row with a total of 19 rows to create the carpet cloak. Note that the lattice metamaterial has seamless connections with the background material as shown in FIG. 4 part e. From a fabrication point of view, the total mass of the hard material can be tuned or adjusted by geometry modifications. In particular, special treatments are made for masses on the middle line of the cloak, where discontinuities emerge. We merge the two half masses into one mass properly enlarge its area equal to the area of the masses.

Figure 5:
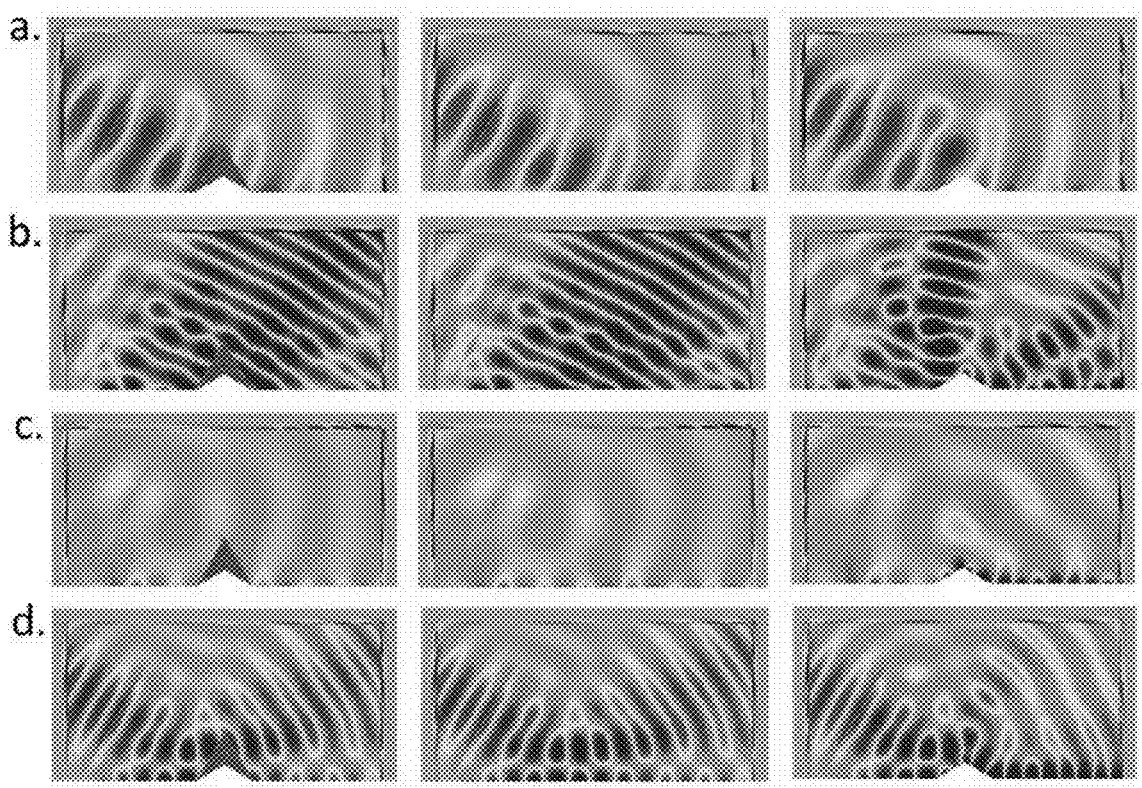
FIG. 5 illustrates numerical simulations of a carpet cloak using lattice-based polar metamaterials.

In numerical simulations, Navier's equations in the background medium and in the lattice metamaterial are solved using COMSOL Multiphysics or another suitable finite element analysis tool. Matched layers surrounding the background medium are adopted to suppress reflected waves from boundaries. Incident waves with Gaussian profiles in the direction of −60° are emitted to the cloak region (other incident angles are discussed later herein). Simulation results are shown in FIG. 5 for an incident pressure wave (FIG. 5 part a and FIG. 5 part b) and incident shear wave (FIG. 5 part c and FIG. 5 part d) at 400 Hz. Specifically, a variety of numerical simulations of the carpet cloak with the lattice-based polar metamaterial are shown. Images in the first column show the results when the lattice metamaterial is embedded in the background medium for cloaking. Images in the second column show the results when the background medium is intact. Images in the third column show the results when the void is non-coated. Part a shows divergence of the displacement field with a pressure incidence; part b shows curl of the displacement field with a pressure incidence; part c shows divergence of the displacement field with a shear incidence; and part d shows curl of the displacement field with a shear incidence.

Figures in the first column show the results when the lattice metamaterial is embedded in the background medium for cloaking. For reference, we perform the same simulations where the background medium is intact (the second column) and the void is non-coated (the third column). The divergence and curl of the displacement field are shown in parts a and c and parts b and d, respectively. It can be seen that the designed lattice metamaterial demonstrates excellent cloaking performance as it almost perfectly suppresses pressure, shear, and Rayleigh scattering due to the presence of the void. Specifically, the lattice metamaterial significantly reduces scattered shear waves from the void, which are more sensitive to defects compared with pressure waves, due to the shorter wavelength. Simulations are also conducted to study the cloaking performance of the lattice metamaterial under different incidence angles (discussed later herein). The results still demonstrate an excellent cloaking performance.

Figure 6:
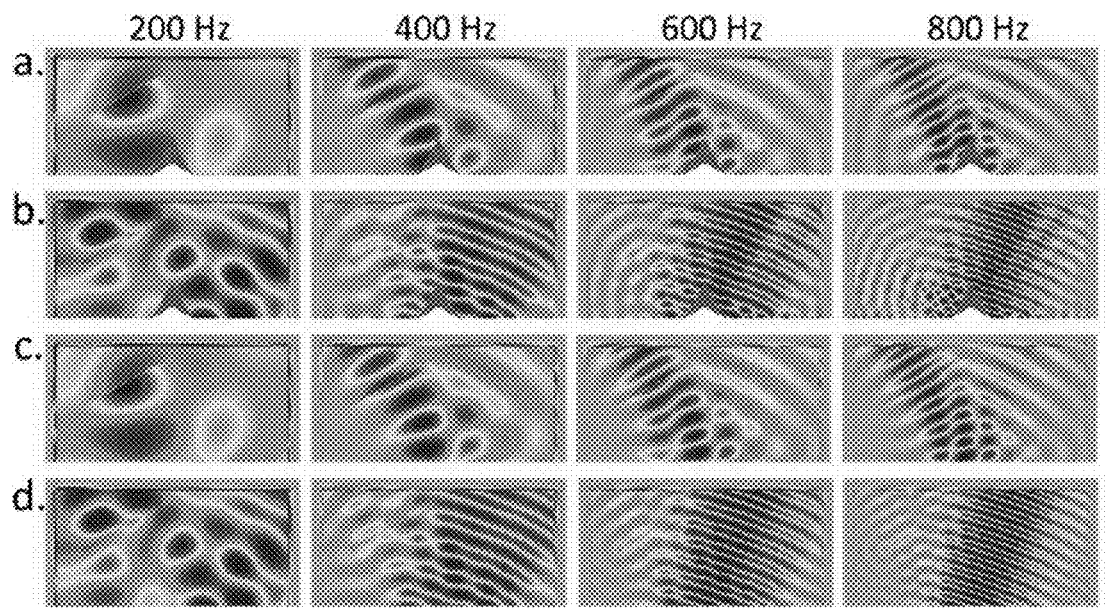
FIG. 6 illustrates numerical simulations of the carpet cloak with a −30° incidence at different frequencies.

The lattice metamaterial designed using the method described herein comprises no resonance structures, meaning that the design could be operated at much broader frequency regions and as long as the unit cell size is small compared to the incident wavelength (that said, there are no limitations on the size of the cloaked void). To demonstrate this, numerical simulations at different frequencies have been performed. FIG. 6 shows numerical simulations of the carpet cloak with −30° incidence at different frequencies. Figures in the first to fourth columns show the results at 200, 400, 600, and 800 Hz, respectively. Parts a and b show divergence (part a) and curl (part b) of the displacement field with a pressure incidence, where the cloak is embedded in the background medium; and parts c and d show divergence (part c) and curl (part d) of the displacement field with a pressure incidence, where the background medium is intact.

As shown in FIG. 6, pressure waves are excited in the direction of −30°, and the cloaking performance of the metamaterial (FIG. 6 part a and FIG. 6 part b: divergence and curl of the displacement field) is compared with the wave fields where the background medium is intact (FIG. 6 part c and FIG. 6 part d: divergence and curl of the displacement field). In the figure, the first to fourth columns show the simulation results at 200, 400, 600, and 800 Hz, respectively. It can be seen that good cloaking performances still retain at frequencies below 600 Hz, whereas, at 800 Hz, the shear wave field produced by the metamaterial cloak slightly deviates from that reflected from a flat boundary. To improve the performance, the size of the metamaterial unit cell (e.g., 400) can be reduced.

Figure 7:
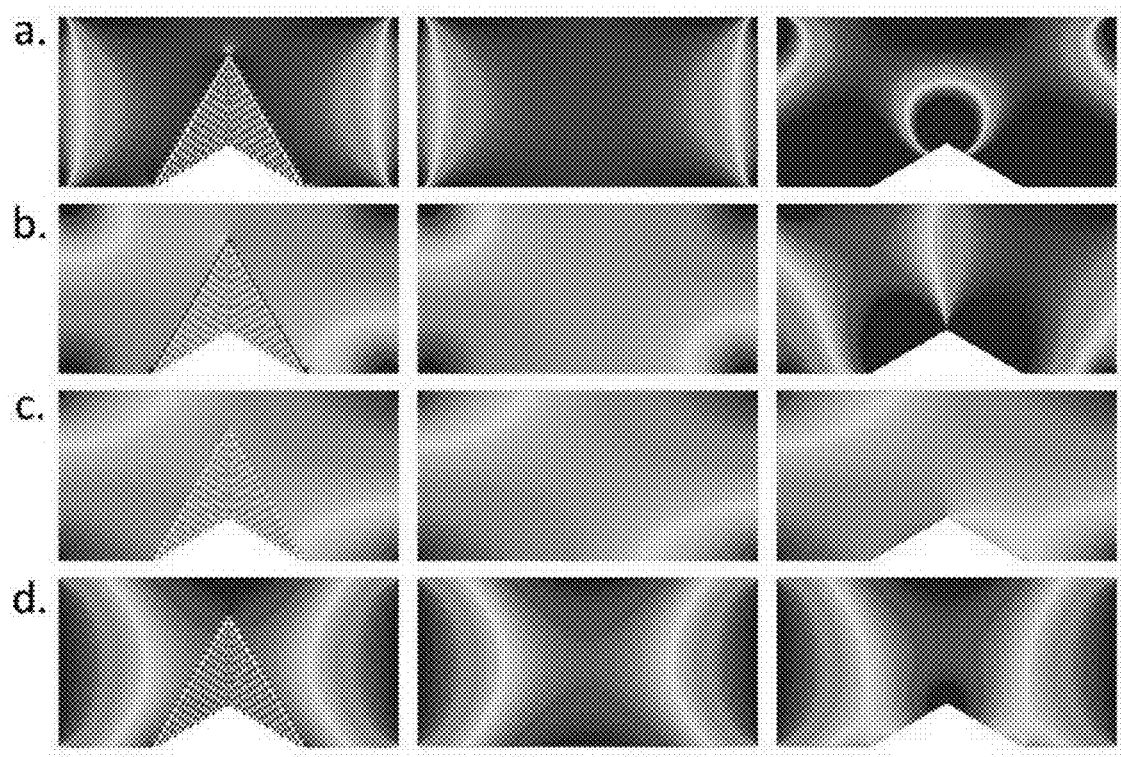
FIG. 7 illustrates numerical simulations of the carpet cloak with static loads.

Besides dynamic pressure and shear loads, the lattice metamaterial cloak can also hide the void from static loads. In static numerical tests, the right boundary of the background plate is fixed and prescribe displacements on its left boundary. Other boundaries are left free. FIG. 7 shows numerical simulations of the carpet cloak with static loads. Figures in the first column show the results when the lattice metamaterial is embedded in the background medium for cloaking. Figures in the second column show the results when the background medium is intact. Figures in the third column show the results when the void is non-coated. Part a shows divergence of the displacement field with an elongation along the horizontal direction; part b shows curl of the displacement field with an elongation along the horizontal direction; part c shows divergence of the displacement field with a shear along the horizontal direction; and part d shows curl of the displacement field with a shear along the horizontal direction.

With reference to FIG. 7, the prescribed displacement is along either horizontal (FIG. 7 parts a and b) or vertical (FIG. 7 parts c and d) directions to induce elongation or shear in the background plate. Similar to FIG. 5, the first column in FIG. 7 shows the results when the lattice metamaterial cloak is embedded, and the second and third columns are for the intact background medium and the non-coated void. Again, the divergence and curl of the displacement field are shown in FIG. 7 parts a and c and FIG. 7 parts b and d, respectively. The numerical simulation shows that the lattice metamaterial cloak significantly improves the pressure and shear fields when the background plate undergoes elongation. In addition, the triangular void is insensitive to the shear load, where the figures in the first to third columns are nearly identical. Finally, it is also worth mentioning that the modulus of the hard material can be reduced in real designs.

It should be understood that the metamaterial cloak described herein has been with reference to a triangular geometry, but other geometries, in fact any geometry, are possible using the design method described herein. For example, circular, semi-circular, and arbitrary shapes are possible.

In summary, a method has been disclosed using discrete transformation elasticity to design lattice-based polar metamaterials that can automatically satisfy constitutive requirements from arbitrary coordinate transformations. In particular, a lattice metamaterial that exhibits desired polarity, chirality, and anisotropy of a transformed continuum has been developed. Based on this polar metamaterial, an elastic carpet cloak is constructed and demonstrated numerically for concealing a triangular void. The disclosed method establishes a design framework for tackling the inverse design problems of lattice-based materials targeting transformed macroscopic constitutive tensors, not only for those required by elastic cloaks. Given the fact that transformation elasticity is a highly flexible method for exploiting new material parameters by varying coordinate transformations or materials in the virtual space, the lattice metamaterials designed based on discrete transformation elasticity can provide for a wide range of control functions in dynamics and statics in general i.e. waveguiding, illusion, and shape morphing. Furthermore, the metamaterials designed based on this approach are ready to be used without geometric alterations or discontinuities. This design approach, therefore, holds advantages over other methods in building lattice-based topologies related to transformation elasticity. As far as the proposed approach itself goes, it generalizes to 3D in a straight-forward manner; the structure will simply extend in a third periodicity direction along which the geometry and the elastic properties are determined by the same principles that determined the in-plane properties. In 3D, fabrication becomes more challenging since a 3D system of grounded rods can be impractical. In that case, the rotations could be impeded dynamically by leveraging the rotational resonance of appropriately designed embedded resonators.

Referring now generally to FIGS. 8-11 additional details are provided for the physical construction of a metamaterial cloak according to the design method previously described and testing of the physical metamaterial cloak. Generally, and as previously explained, the artificially structured materials, known as metamaterials, have significantly improved the ability to steer waves and channel energy in different areas of physics. In particular, they brought the invisibility cloaks, featured in several pop cultural landmarks, to reality. Briefly, a cloak is a coating material that makes an object indistinguishable from its surroundings or undetectable by external field measurements of a specific kind; to name a few, invisibility cloaks for light sound, heat and so on. In accordance with the design method previously explained, cloaking is achieved with transformations that deform a region in such a way that the mapping is one-to-one everywhere except at a single point, which is mapped into the cloak inner boundary. A key step in a cloak's design is to apply a suitable warping transformation to the background medium and to accordingly rewrite its governing equations in a manner that reveals what constitutive materials are needed. The constitutive parameters of the cloaking material in the physical domain can then be defined by a spatial transformation and gauge matrices. Often, these materials are anisotropic when the background medium is isotropic. At first sight, this should mean that cloaking in solids for full elasticity is more accessible than in fluids for acoustics since anisotropic solids are potentially easier to fabricate than "anisotropic fluids". Nonetheless, a closer look reveals that elastic cloaks, in general, further require their materials to be polar, i.e., to exhibit asymmetric stresses. Polarity turns out to be necessary if shear and hydrostatic stresses are coupled as is typically the case in elasticity. The lack of subwavelength microstructures, whose unit cell size is much smaller than operating wavelength, producing an effective polar elastic behavior has blocked the progress in the area of cloaking in solids for decades. As we have disclosed herein, a new design method and a new way to fabricate and test the first of these structures for cloaking applications in two dimensional elasticity has been developed.

It has long been thought that the Cosserats' micropolar solids are suitable for cloaking given that they naturally feature asymmetric stresses. This common wisdom is misleading, however, since what truly distinguishes the Cosserat theory from the standard one by Cauchy, kinetically and kinematically, is the presence of couple stresses on one hand and of microrotations on the other hand instead of the nature of the Cauchy stress tensor. This discovery has led, within the standard theory, to the design method described herein and the resulting cloak that revisits the principle responsible for the symmetry of stresses, namely the local balance of angular momentum. Achieving cloaking in solids by breaking the stress symmetry relies on finding the structures where the balance of angular momentum is maintained differently. As described herein, the design method and resulting cloak physically realizes such cloaking by introducing the distribution of large body torques in the form of constraints which limit the local rotations. To realize the constraints and functions described previously with respect to, for example, limiting rotation, the design of the metamaterial includes several layers, one to guide stresses, and the others to impose the constraints. Tests performed under static compression and shear demonstrate satisfactory cloaking performance of a semi-circular void or inclusion (other shapes and configurations are possible). The design techniques and cloaks described herein fill the current gap which separates the transformation elasticity, in both static and dynamic regimes, from the already mature fields of transformation acoustics and optics thus enabling similar capabilities in the control and steering of general stress fields.

Figure 8:
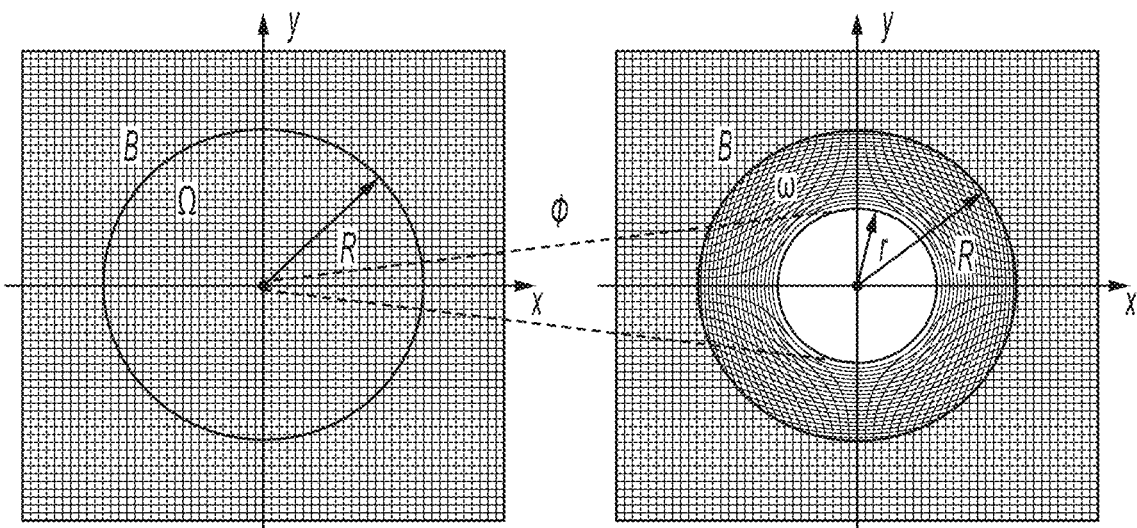
FIG. 8 is a schematic representation of a transformation method.

FIG. 8 shows a schematic representation of the transformation method previously described: $\Omega$ is a fictitious reference medium and $\omega$ is the physical medium; transformation $\phi$ maps a point of the reference into a circular area of radius r hosting the cloaked object while leaving unchanged the background beyond a distance R from the center; the remaining annulus of thickness R-r hosts the cloak.

Consider the two media $\Omega$ and $\omega$ of FIG. 8: the former is a fictitious reference medium and the latter is the physical medium. While they match in shape and composition over the background B, they differ within a disk of radius R corresponding to a cloaked area, which is composed of a cloak of thickness R–r and of a cloaked circular object of radius r. Cloaking is successful when the respective displacement fields U and u of $\Omega$ and $\omega$ are equal over the background B regardless of the applied loading or of the composition of the cloaked object. To derive the elastic properties of the cloak, it is ensured that $\Omega$ and $\omega$ have elastic energy densities $$L(\nabla U) = \frac{C_{ijkl}U_{i,j}U_{k,l}}{2} \text{ and } \ell(\nabla u) = \frac{c_{ijkl}u_{i,j}u_{k,l}}{2}$$

that are identical up to the change of variables $U(X) = u(x)$ for $x = \phi(X)$ where $\phi$ maps $\Omega$ to $\omega$. That is $$\ell(\nabla u) = \frac{\mathcal{L}(\nabla uF)}{J}$$

or in terms of elasticity tensors: $c_{ijkl} = J^{-1}F_{jm}F_{ln}C_{imkn}$, $F = \nabla\phi$, and $J = |F|$. In what follows, the background B is assumed to be homogeneous and isotropic; the cloaked object is a void; and the cloaking transformation is radially symmetric:

$$x = \frac{f(r)}{\|X\|}X$$

with $$f(r) = \frac{\|x\| - r}{\|x\|},$$

where the radius r is measured from the center of the cloaked area.

Therefore, cloaking an object in a background B of elasticity tensor C requires materials whose elasticity tensor is c; the problem is that no such materials were previously known. As previously discussed, the solution is the design and materials described herein. Standard elasticity tensors satisfy three fundamental properties: (i) they are positive definite, namely if E is non-skew then $C_{ijkl}E_{ij}E_{kl} > 0$; (ii) they have the major symmetry $C_{ijkl} = C_{klij}$ and (iii) the minor symmetry $C_{ijkl} = C_{ijlk}$. By analyzing the constitutive behavior of the transformed/coating material in the Brun-Guenneau-Movchan (BGM) gauge, it was discovered that c only satisfies condition (ii) of major symmetry. The design method then concludes that cloaking materials should accommodate a compliant mechanism, i.e., a zero-energy deformation mode or "zero mode". In the present case, the zero mode is $E_{zm} = f(r)e_1 \otimes e_2 - e_2 \otimes e_1$ (detailed derivation in Appendix B). As for condition (iii), it is a consequence of Cauchy's second law of motion stating that the skew part of the stress tensor is equal to the externally applied body torque: $t = \epsilon_{3jk}\sigma_{jk} = \sigma_{12} - \sigma_{21}$. Typically, body torque is zero, the stress tensor is symmetric and the elasticity tensor has minor symmetry. Negating the latter, we deduce that cloaking materials are necessarily a polar material, a material that elastically resists rotation, and must be subject to an externally applied body torque $$t = \mu\left[\left(\frac{1}{f} - 1\right)E_{12} - (f-1)E_{21}\right]$$

Figure 9A:
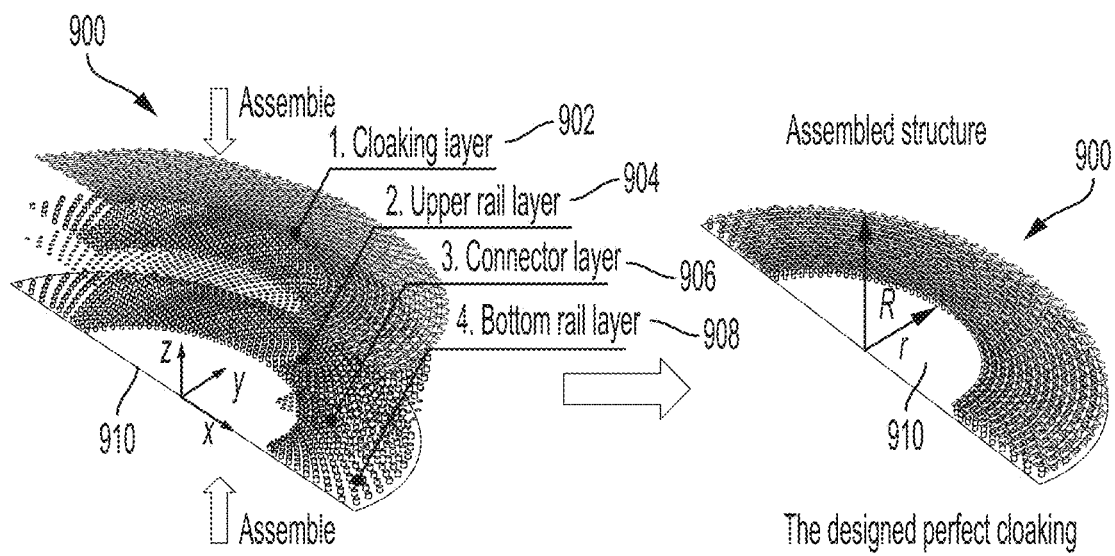
FIG. 9 is a schematic illustration of a polar-mechanical cloak and the design and fabrication thereof.
Figures 9B, 9C, 9D:
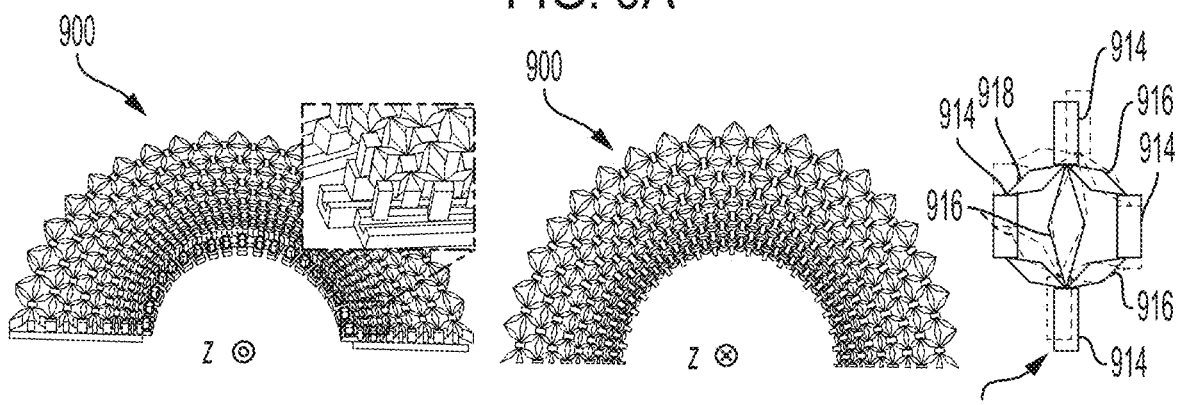

FIG. 9 shows the design and fabrication of a polar-mechanical cloak according to the design discussed herein. Part a shows the cloak comprising 4 different layers, in the z-axis view, from top to bottom, arranged as: layer 1-cloaking lattice 902; layer 2-upper rail 904; layer 3-connector 906; and layer 4-bottom rail 908. The bottom rail layer 908 is fixed in a rigid plate 910 as a ground condition (e.g., to limit rotation). The size cloaking region and cloaking lattice are r=95 mm and R=200 mm respectively (as shown in FIG. 9 part b illustrating the assembled cloak 900). Any object can be placed inside of the hollow interior and thereby becomes cloaked (e.g., 'unfilmable' or isolated from elastic deformation, loading, etc.). For any given pulling direction, the cylindrical core-shell geometry exhibits a symmetry plane normal to the pushing direction and cutting through the middle of the cylinder. Thus, it is sufficient to study the half-cylinder geometry. FIG. 9 part b shows a top view of the assembled cloak 910. The layer 1 (cloaking lattice 902) has been assembled with layer 2 (upper rail 904), layer 3 (connector 906), and layer 4 (bottom rail 908). FIG. 9 part c shows a bottom view that reveals the details of the polar-mechanical cloak 900. FIG. 9 part d is an illustration of zero-mode of the unit cell 912 of cloaking layer 902. The cloaking layer 902 comprises a plurality of unit cells 912, each unit cell comprising masses 914 and spring elements 916 that connect masses 914. The spring elements 916 are generally rhombus shaped.

The cloaking (polar) materials are designed and fabricated based on the transformation method and design methods described herein. The cloaking material is composed of a functionally graded four-layered lattice embedded in an isotropic continuum background as shown in FIG. 9 parts a through c. A mechanism to make interconnection among the four layers is proposed: layer 1 (cloaking layer 902) works as the lattice guiding the stresses; layer 2 (upper rail layer 904) is the first set of rails whereas, layer 4 (bottom rail layer 908) is the second set of rails bound to a relatively rigid material as an effective ground; layer 3 (connector layer 906) connects layer 2 (upper rail layer 904) and layer 4 (bottom rail layer 908) and ensures the transmission of torques between them as shown in FIG. 9 part a. In the depicted design, each lattice site is free to move by sliding over an assembly of two orthogonal rails (upper rail layer 904 and bottom rail layer 908). By grounding the rails, the sites' rotations are impeded. In other words, the grounded rails act as a torsional spring: they apply a torque proportional to the site's angle of rotation (this is described in greater detail later here). As a result, the distributed external torques t are properly applied to break stress symmetry. Given that, the lattice material shown in FIG. 9 parts b and c exhibit an effective elasticity tensor of the same form as c. At each location x, the thickness of the bars and the aspect ratio of the unit cell must be adjusted to fit exactly the targeted tensor c; this is confirmed for each unit cell through a numerical homogenization procedure. Meanwhile, the thickness of the hinges is kept to a minimum to approximately reproduce the behavior of an ideal pin transmitting zero bending moment (e.g., the hinge can be a living hinge). Therefore, the zero mode of the lattice shown in FIG. 9 part d can be easily obtained by adjusting the geometrical relations among the bars as tension-compression elements (this is described in greater detail later herein).

In the depicted embodiment the layers were 3D printed and manually assembled; the material properties are listed in Table 1 below. 3D printing is only one possible method of manufacture and it should be understood that the cloak can be constructed using any suitable construction technique and any suitable material. It is noteworthy that the Poisson's ratio of the background medium is 0.33; in this particular case, the elastic moduli of the rails, connectors, and ground become irrelevant as long as they are significantly higher than those of the background. For other Poisson's ratios, these moduli become important design parameters. To validate the design strategy, numerical simulations of a void cloaked in a two-dimensional plate under either pressure or shear loading were conducted by using a fictitious polar continuum and then by using the proposed lattice-based medium; the comparison showed very good agreement (discussed in greater detail below). The simulation demonstrates the displacement fields in the proposed lattice structures with and without body torque and the excellent elastic cloaking performance from the polar material.

TABLE 1

Material Properties of the Designed Cloaking

|  | Young's modulus (GPa) | Density (kg/m$^3$) | Poisson's ratio |
| --- | --- | --- | --- |
| Layer 1 | 1.50 | 1170 | 0.33 |
| Layer (2~4) | 2.50 | 1180 | 0.33 |
| Host medium | 1.25 | 1270 | 0.33 |

Figure 10A:
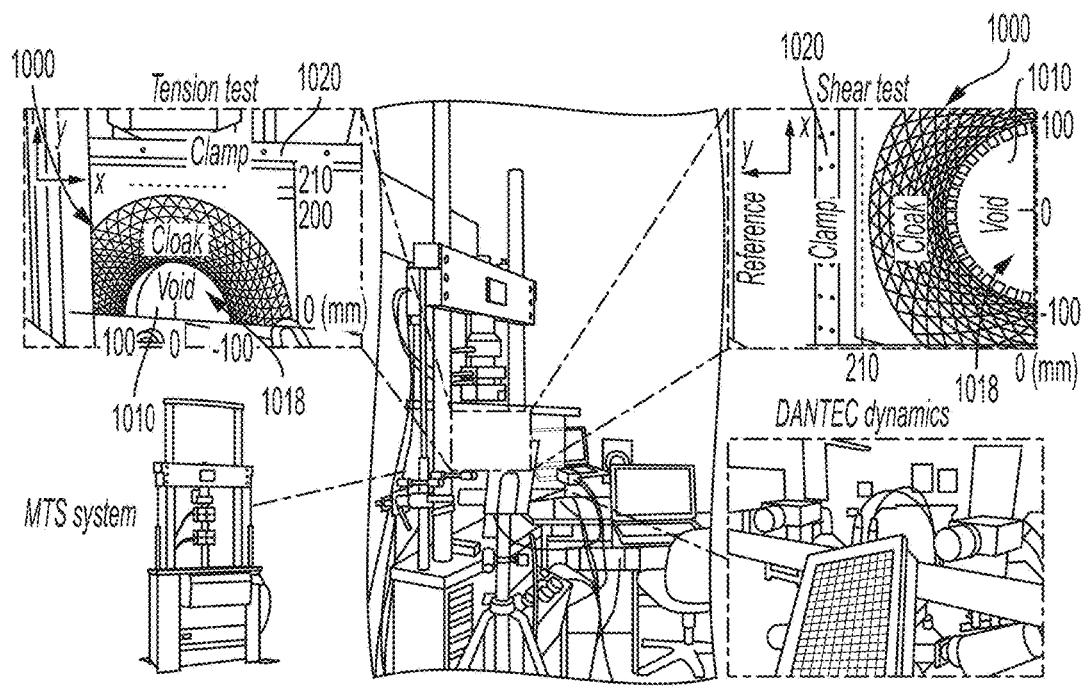
FIG. 10 illustrates an experimental setup for both tension and shear static testing of an elastic cloak as well as test results.
Figure 10B:
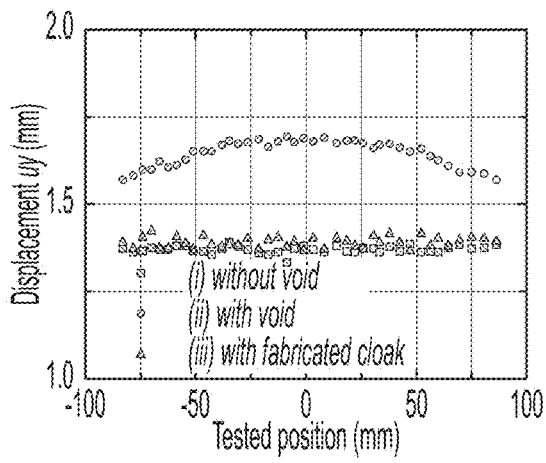
Figure 10C:
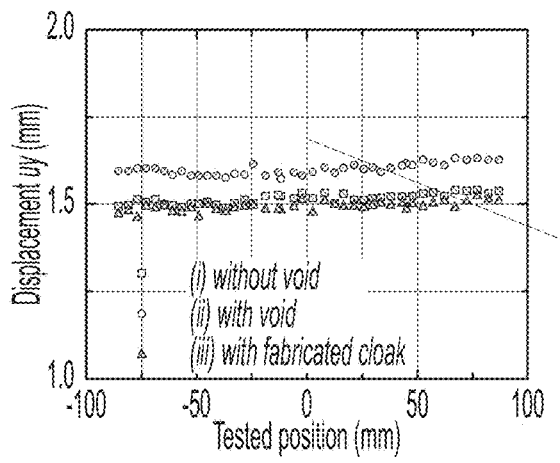
Figure 11A:
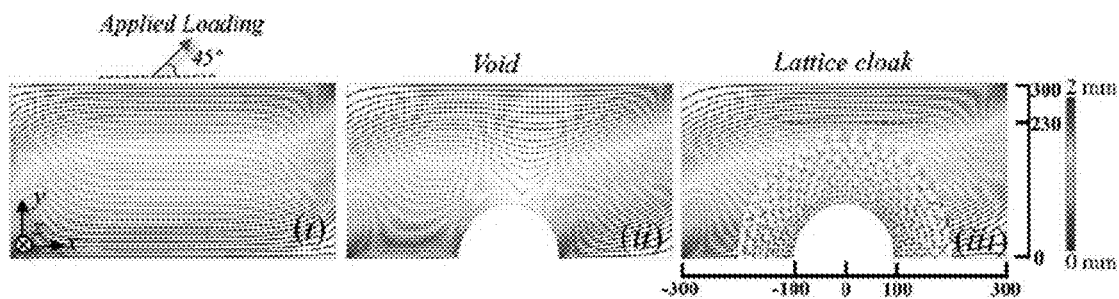
FIG. 11 illustrates the total displacement field under a general mechanical loading at the top boundary of a test plate under various conditions and test results.
Figure 11B:
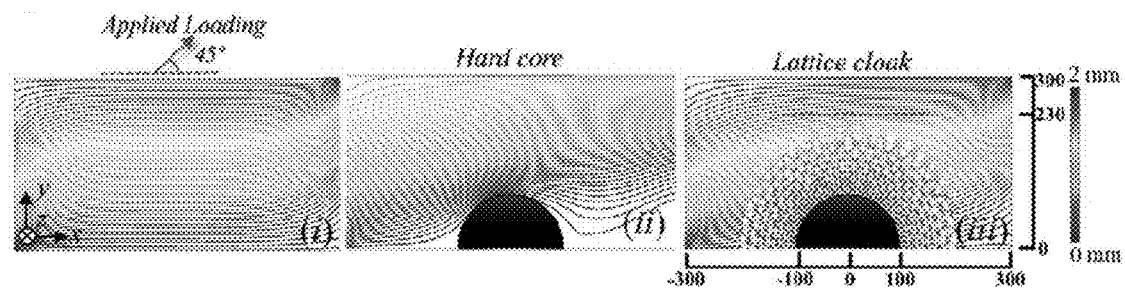
Figure 11C:
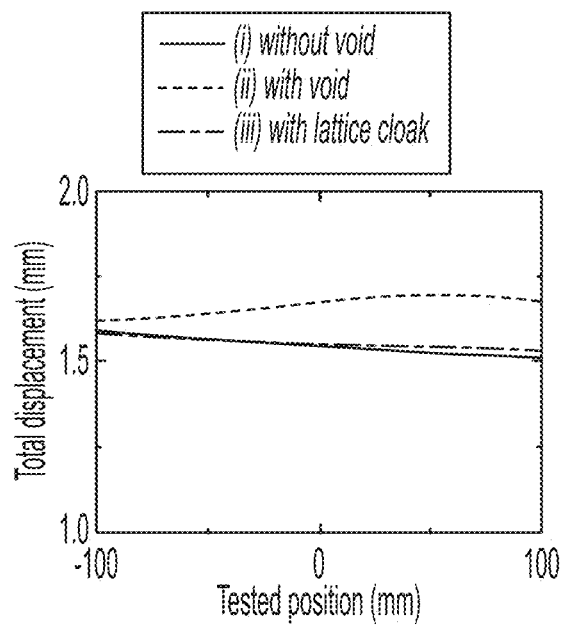
Figure 11D:
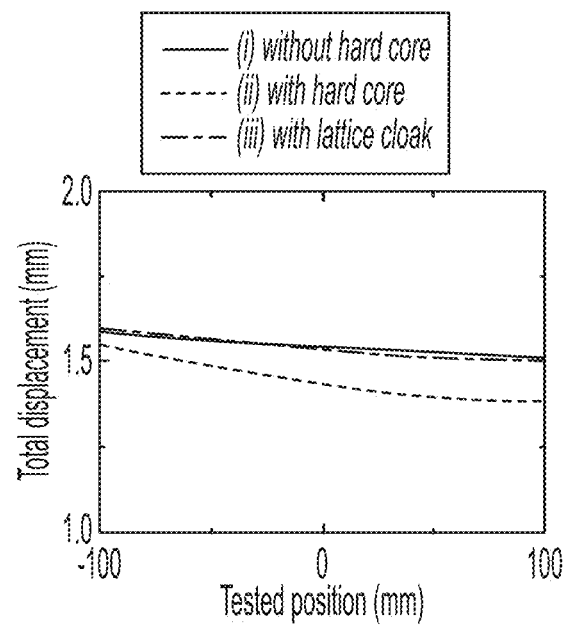

FIG. 10 part a shows the experimental setup of both tension and shear static test of the elastic cloak 1000. The sample consists of lattice cloak 1000, background material 1010, void 1018, and a clamp 1020. The tension and shear loading are supplied by the testing machine (e.g., an MTS system). The displacement in dotted line due to the strain (in FIG. 10 part a) is measured by, for example, a DANTEC dynamics system (The width of the dotted red line is from −100 mm to 100 mm in the x-axis and the distance from the measured line to the bottom of the plate is 210 mm in the y-axis). Part b shows the measured displacement fields with and without the cloaking device under a static pressure field applied to the top boundary and fixed boundary conditions from below: (i) without void (squares), (ii) with void (dots), (iii) with fabricated cloak (triangles). Part c shows the measured displacement fields with and without the cloaking device under a static shear field applied to the center of the plate and fixed boundary conditions on the other side: (i) without void (squares), (ii) with void (dots), (iii) with fabricated cloak (triangles).

To test its cloaking abilities, the proposed design is bonded to a background medium through its stress guiding layer, i.e., layer 1. In the quasi-static characterization experiments shown in FIG. 10 part a, a holder holds the top side of the sample and pulls the sample via a motorized translational stage. The loading is applied by an MTS system both for tension and shear tests. The loading speed is 0.2 mm/min. To keep the deformations in the linear region, the maximum global strain applied was of about 1%. The holder at the bottom is fixed. In the tested sample, the void is a half circle with a radius of 95 mm and the radial thickness of the lattice cloak is 200 mm attached to the host medium plate with a length of 300 mm and a width of 600 mm. Meanwhile, the backside of layer 4 is fixed to an aluminum plate with length 400 mm and width 250 mm. Deformation was measured through optically imaging the entire structure from the side, that is, in a plane perpendicular to the sample, and filming the deformation using a DANTEC dynamics system while varying the loading. The obtained images were analyzed using an autocorrelation software tracking individual points (red dotted line in experimental setup) and delivering a spatial resolution beyond that of the individual camera pixels. This analysis provided the displacement directly from the experiment with a good signal-to-noise ratio. In this manner, the background medium is loaded and displacements are measured in two cases pertaining to tension and shear. The measurements are then compared to those obtained by loading two reference samples of the background medium, one with the void and one without it, both in the absence of the cloak.

The measured displacements are depicted in FIG. 10 parts b and c for the tension test and the shear test, respectively. Both plots show satisfactory cloaking performance. In particular, the lattice cloak succeeds in suppressing the localization expected and observed in the vicinity of the uncloaked void and restores the uniform displacement profile observed in the reference sample. In other words, the cloak reinforces the void without disturbing the fields in the background. Comparison of numerical (discussed throughout) and experimental results is satisfactory as well: the minor differences observed could be attributed to the variability of the material properties produced by the 3D printing of both the lattice cloak and the host medium. This can be addressed through alternative manufacturing and/or materials.

FIG. 11 shows the total displacement field under a general mechanical loading (red arrow) at the top boundary of the test plate under a variety of conditions: part a showing (i) without void, (ii) with void, (iii) with lattice cloak; part b showing (i) without hard core, (ii) with hard core, (iii) with lattice cloak. The total displacement at the dotted line (from −100 mm to 100 mm in the x-axis, at 230 mm in the y-axis) for plate with void and hard core are shown in part c and part d respectively.

Coated inclusions that do not disturb background fields obtained under loading at infinity are known as "neutral inclusions". Typically, however, the properties of the coating need to be changed in function of the loading and of the core's properties. By contrast, the proposed cloak is universal. On one hand, the provided experimental results, along with the isotropy and linearity assumptions, show that the tested loading can be combined and rotated so as to provide similar cloaking performance for any static loading. As an example, a mechanical cloaking is simulated in the presence of a localized force applied at a 45° angle to the top boundary with satisfactory results (FIG. 11 part a). On the other hand, based on the transformation method, it is possible to predict similar cloaking performance for any core properties (void, elastic or rigid). Indeed, the void's region is equivalent to a vanishingly small region, ideally a point, in the original domain. Therefore, filling the void with different material amounts to changing the elastic properties of a small region of the original medium; such a perturbation has negligible effects on any static equilibrium. Here too, numerical simulations validate this hypothesis: cloaking a hard core (aluminum) instead of a void, using the same lattice, produces the same fields in the background as those present in the absence of both inclusions (FIG. 11 parts b through d).

Thus the design method and cloak disclosed herein have resulted in a design and fabrication of a static cloak shielding against combined pressure and shear stress fields using lattice-based polar materials that exhibit asymmetric stresses. Experimental and numerical investigation of the characteristics of the proposed cloak have been performed finding very good cloaking performance under both tension and shear loadings. The cloak is further universal in that it is able to hide an inclusion of arbitrary composition from external loadings of arbitrary orientation. These results, in static conditions, will help make cloaking against stress waves, and similar techniques can be used in dynamic loadings using the same or similar polar materials-based architectures and design techniques.

Figure 12A:
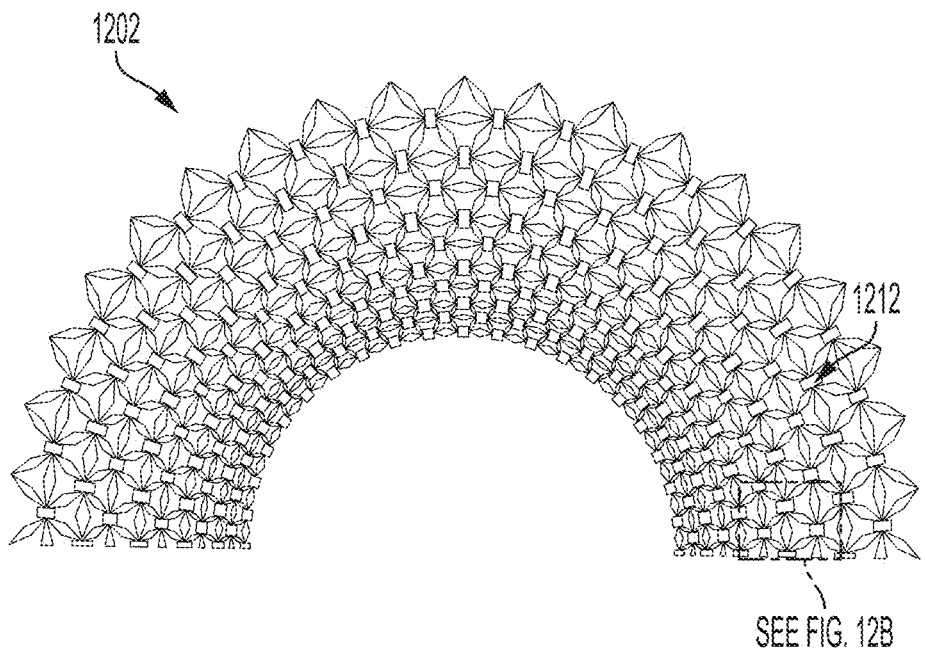
FIG. 12 illustrates portions of a metamaterial cloak.
Figure 12B:
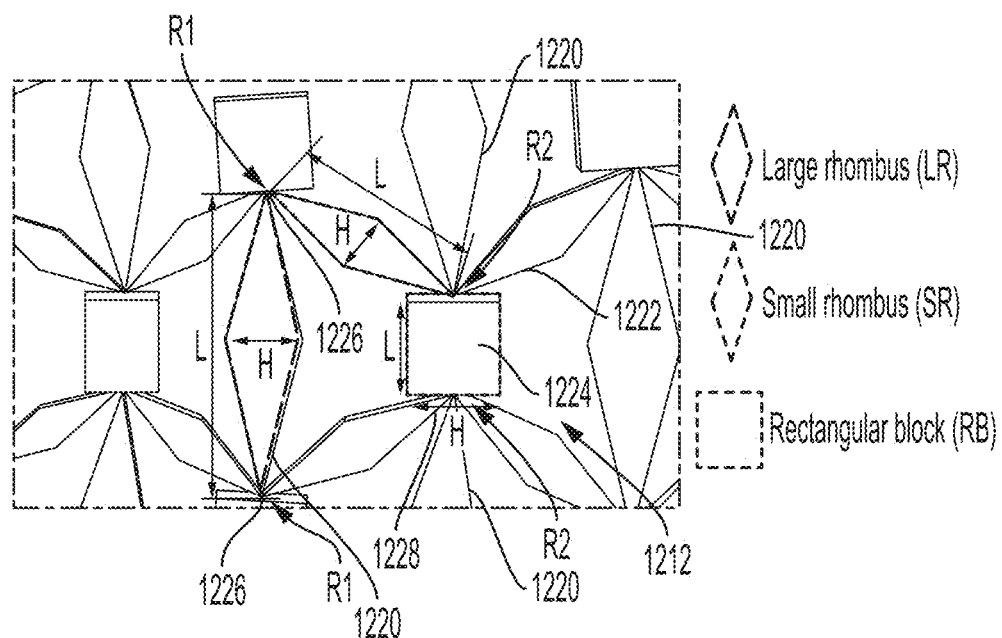

Portions of the physical metamaterial cloak and its testing and discussed in greater detail in the following. The geometry of the metamaterial cloak can vary depending on the application according to the design method previously described. In the embodiment thus far discussed, the metamaterial cloak of hemispherical shape has the following properties. The lattice cloak is 3D printed using a Stratasys® Objet Connex 260 using two base materials Vero White Plus and Tango Black Plus. In alternative embodiments, other construction techniques and/or materials can be used to create the lattice cloak (e.g., metamaterial cloak). The 3D structural models in Mph format were built in COMSOL Multiphysics and then converted into STL file for printing. For the top lattice layer (e.g., cloaking layer 902), due to the fabrication limitation, as shown in FIG. 12, halves were printed separately using RGD8530 (a combination of two base materials) and glued together with the same materials under UV curing, while the components of the rail layers (e.g., upper rail layer 904 and/or bottom rail layer 908) and/or the connector layer (e.g., connector layer 906) were printed with pure Vero White Plus individually. All the supporting material was cleaned carefully by waterjet.

FIG. 12 part a illustrates the glued top lattice layer 1202 (e.g., the cloaking layer) composed of 200 unit cells 1212. Part b illustrates an enlarged drawing of the portion framed in part a including a unit cell 1212. The unit cell 1212 includes large rhombus(es) (LR) 1220 that function as spring elements, small rhombus(es) (SR) 1222 that function as spring elements, and the rectangular block(s) 1224 that function as mass element(s). The joint 1226 at the top and bottom of LR is semicircle with radius R1 and the joint at left 1226 and right 1228 of SR is also a semicircle with radius R1 and R2, respectively. The joints can be any suitable joint but are preferably a living hinge. More geometry details are presented in the following table.

TABLE

Geometry parameters of lattice cloak in each layer.

| Title | L (mm) | H(mm) | T (mm) | R1 (mm) | R2 (mm) |
|---|---|---|---|---|---|
| LR1 | 24.9 | 6.2 | 10 | 0.5 | 0.5 |
| LR2 | 22.4 | 5.6 | 10 | 0.47 | 0.47 |
| LR3 | 20.4 | 5.1 | 10 | 0.45 | 0.45 |
| LR4 | 18.5 | 4.6 | 10 | 0.41 | 0.41 |
| LR5 | 16.9 | 4.2 | 10 | 0.39 | 0.39 |
| LR6 | 15.4 | 3.8 | 10 | 0.36 | 0.36 |
| LR7 | 14.4 | 3.5 | 10 | 0.33 | 0.33 |
| LR8 | 12.9 | 3.2 | 10 | 0.30 | 0.30 |
| LR9 | 11.9 | 3.0 | 10 | 0.27 | 0.27 |
| LR10 | 11.0 | 2.8 | 10 | 0.25 | 0.25 |
| SR1 | 19.5 | 4.9 | 10 | 0.5 | 0.5 |
| SR2 | 18.8 | 4.7 | 10 | 0.47 | 0.5 |
| SR3 | 15.4 | 3.9 | 10 | 0.45 | 0.47 |
| SR4 | 14.8 | 3.7 | 10 | 0.41 | 0.45 |
| SR5 | 12.1 | 3.0 | 10 | 0.39 | 0.41 |
| SR6 | 11.6 | 2.9 | 10 | 0.36 | 0.39 |
| SR7 | 9.5 | 2.4 | 10 | 0.33 | 0.36 |
| SR8 | 9.2 | 2.3 | 10 | 0.30 | 0.33 |
| SR9 | 7.5 | 1.9 | 10 | 0.27 | 0.30 |
| SR10 | 7.2 | 1.8 | 10 | 0.25 | 0.27 |
| SM1 | 3.9 | 8.0 | 14 | 0.5 | 0.5 |
| SM2 | 3.9 | 8.0 | 14 | 0.47 | 0.47 |
| SM3 | 3.9 | 6.3 | 14 | 0.45 | 0.45 |
| SM4 | 3.9 | 6.3 | 14 | 0.41 | 0.41 |
| SM5 | 3.9 | 5.0 | 14 | 0.39 | 0.39 |
| SM6 | 3.9 | 5.0 | 14 | 0.36 | 0.36 |
| SM7 | 3.9 | 3.9 | 14 | 0.33 | 0.33 |
| SM8 | 3.9 | 3.9 | 14 | 0.30 | 0.30 |
| SM9 | 3.9 | 3.1 | 14 | 0.27 | 0.27 |
| SM10 | 3.9 | 3.1 | 14 | 0.25 | 0.25 |

Figure 13A:
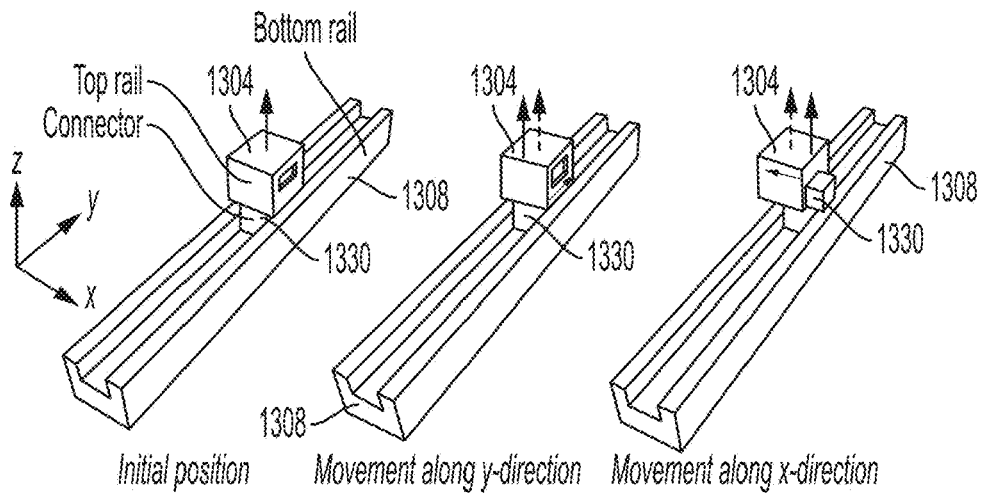
FIG. 13 illustrates portions of a control mechanism of a guide system for the metamaterial cloak.
Figures 13B, 13C, 13D:
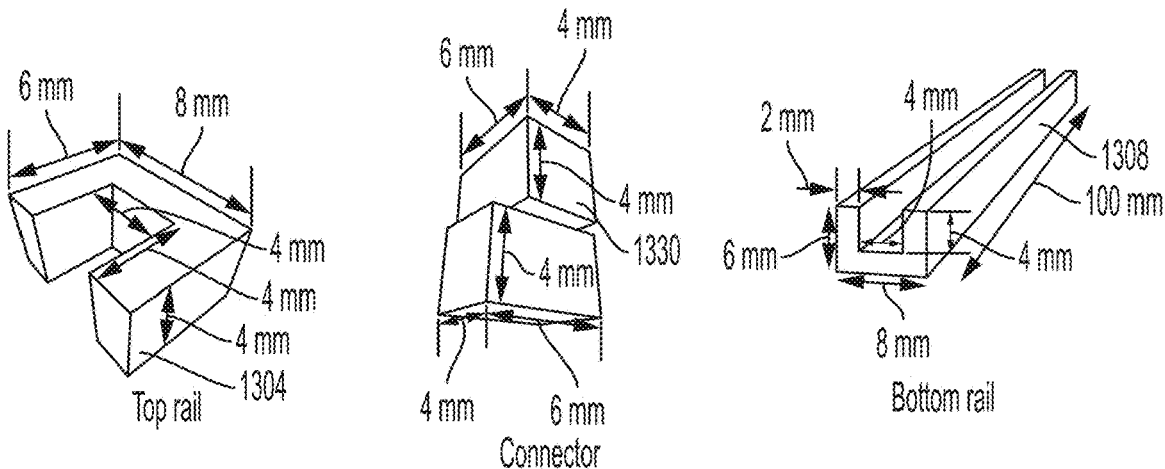

In each unit cell, the guide system consists of three parts as shown in FIG. 13 part a. The bottom rail 1308 is fixed on the ground (not shown), and the top rail 1304 is fixed with the top lattice layer (not shown), e.g., using a rod to connect the top rail to each mass of the top lattice layer. The top rail 1304 and the bottom rail 1308 are coupled by a connector 1330, the top lattice layer, being coupled to the top rail 1304 by rods, can only move along x-direction and y-direction while rotation is prohibited (e.g., as shown in FIG. 13 part a). Translation is effected through the relationship between these components. The bottom rail 1308 forms a channel in which the connector 1330 is allowed to move in a single direction (e.g., the y direction). The connector is likewise situated in a channel formed by the top rail 1304 ion which the connector 1330 is allowed to move in a single direction (e.g., perpendicular to that of the bottom rail 1308). The channels of the rails constrain movement of the connector 1330 to a single direction for each rail. The connector 1330 include two portions, each sized to slidably engage with the bottom rail 1308 and the top rail 1304, respectively. It should be understood that retaining features (not shown) can be included in one or more of the bottom rail 1308, top rail 1304, and/or the connector 1330 to limit or prevent movement or separation in the z direction. For example, the rails can have retaining lips or flanges that engage with a corresponding portion of the connector to retain the connector within the channel of the rail. In some embodiments, lubricating oil is added between the rails to reduce friction. The geometry details of the guide system are presented in FIG. 13 parts b through d according to one embodiment.

The following provides additional detail regarding the transformation method and homogenization of the polar elastic metamaterial. By using the transformation of elasticity equations in the BGM gauge and analyzing the nature of the elasticity tensors that emerge as an outcome, a degenerate polar lattice whose behavior matches the elasticity tensor of a 2D designed cloak can be reached. Therein, begin with the constitutive behavior of the harmonic ealastodynamic wave in an elastic domain {X}, and let $$\nabla \cdot \sigma' = -\omega^2 \rho' U, \text{ and } \sigma' = C : \nabla U \qquad (S1)$$

where $\omega$, $\rho'$ and C are the frequency, mass density, and elasticity tensor in the original domain {X} respectively. Thus, the Lagrangian density of the elastic domain {X} can be read as $$L(\nabla U, \dot{U}) = \frac{\nabla U : C : \nabla U - \dot{U} \cdot \rho' \dot{U}}{2} \qquad (S2)$$

Under the mapping $\{X\} \to \{x = \phi(X)\}$ and $\{U(X) \to u(x)\}$, the Lagrangian density reads as $$\ell(\nabla, \dot{u}) = \frac{\nabla u : c : \nabla u - \dot{u} \cdot \rho \dot{u}}{2} = \frac{1}{J} L(\nabla uF, \dot{u}) \qquad (S3)$$

where $F = \frac{\partial x}{\partial X}$ is the transformation gradient and J is the corresponding determinant. The transformed elasticity tensor c and mass density p can be expressed as $$c_{ijkl} = J^{-1} F_{jm} F_{ln} C_{imkn}, \rho = \frac{\rho'}{J} \qquad (S4)$$

Here, when C has the minor symmetry and c does not, that is, $C_{ijkl}=C_{jikl}=C_{ijlk}$ and $C_{ijkl} \ne c_{jikl} \ne c_{ijlk}$, the stress a in the domain $\{x\}$ can be expressed as $$\sigma = c : e, e = \nabla u \text{ with } \sigma_{ij} \ne \sigma_{ji} \tag{S5}$$

In the cloaking design described herein, as previously described with respect to FIG. 8, the coating region $\{r < \|x\| < R\}$ is fulfilling the function of a cloak and its elasticity property is determined by equation (S4). That relation reads $$\begin{bmatrix} \sigma_{11} \\ \sigma_{22} \\ \sigma_{12} \\ \sigma_{21} \end{bmatrix} = \begin{bmatrix} (2\mu+\lambda)f & \lambda & 0 & 0 \\ \lambda & (2\mu+\lambda)/f & 0 & 0 \\ 0 & 0 & \mu/f & \mu \\ 0 & 0 & \mu & \mu f \end{bmatrix} \begin{bmatrix} e_{11} \\ e_{22} \\ e_{12} \\ e_{21} \end{bmatrix}, f = \frac{\|x\|-r}{\|x\|} \tag{S6}$$

where the matrix represents the elasticity tensor in Voigt form. The nullspace of the matrix is one-dimensional with the basis $(0,0,f,-1)^T$, which is corresponding to the zero-mode $E_{zm}=f_1 \otimes e_2 - e_2 \otimes e_1$.

Figure 14:
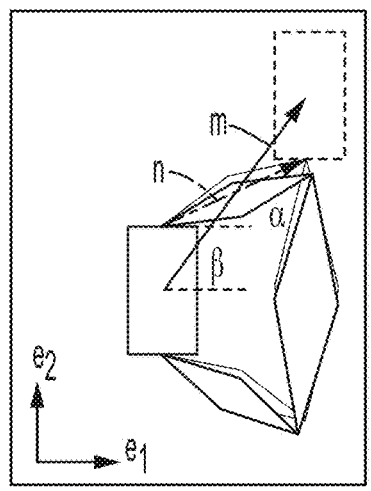
FIG. 14 is a schematic illustration of a determination of a zero-mode of the cloak lattice.

In disclosed design of polar medium, the new zero-mode is necessary because the infinitesimal rotation, which is the zero-mode of Cauchy's media, is constrained by the body torque. The required zero-mode can be realized by adjusting the geometrical relations among the bars. FIG. 14 shows the unit cell of the lattice. Under the strain $E_{zm}$, the displacement of the point at $m = |m|\cos(\beta)e_1 + |m|\sin(\beta) \ e_2$ is $u = E_{zm} \cdot m = |m|\sin(\beta)e_1 - |m|\cos(\beta)e_2$. The upper-right end of the top bar, which is represented by $n = |n|\cos(\alpha)e_1 + |n|\sin(\alpha) e_2$, undergoes the same displacement as the point at m, since the rotation of the block is locked. The zero-mode motion only occurs when the top bar bears no extension or compression, which means $n \cdot u = f|m|\|n|\cos(\alpha)\sin(\beta) - |m|\|n|\sin(a)\cos(f)=0$. Therefore, the required zero-mode can be achieved by keeping $$f = \frac{\tan(\alpha)}{\tan(\beta)}.$$

In the numerical simulations discussed herein, the plane stress hypothesis cane be adopted. The mass densities of the materials are not important here, since the cloaking test is in the static case. In particular, a void of radius r=95 mm is to be cloaked, with a coating of radius R=200 mm, embedded in a rectangular plate of 1 mm thickness and of in plane Lame parameters $\mu=\lambda=0.41\times10^6$ Pa·m and mass density. The coating layer thickness is 1 mm with Young's modulus $E=30\times10^6$ Pa·m. And the lattice cloak consists of 10 layers and 40 sectors and has a theoretical inner radius of r=80 mm. Due to the polar assumption and the control mechanism in FIG. 13, the homogenized property of the proposed lattice can be described using the following equation:

$$\sigma_{ij}=c_{ijkl}e_{kl} \tag{S7}$$

where $\sigma_{ij}$ is the macroscopic or homogenized stress components and $$e_{ij} = \frac{\partial u_i}{\partial x_j}$$

is the macroscopic or homogenized strain components, $u_i$ is the displacement along the i-th direction and $c_{ijkl}$ are the components of the homogenized elasticity tensor.

Figures 15A, 15B, 15C, 15D:
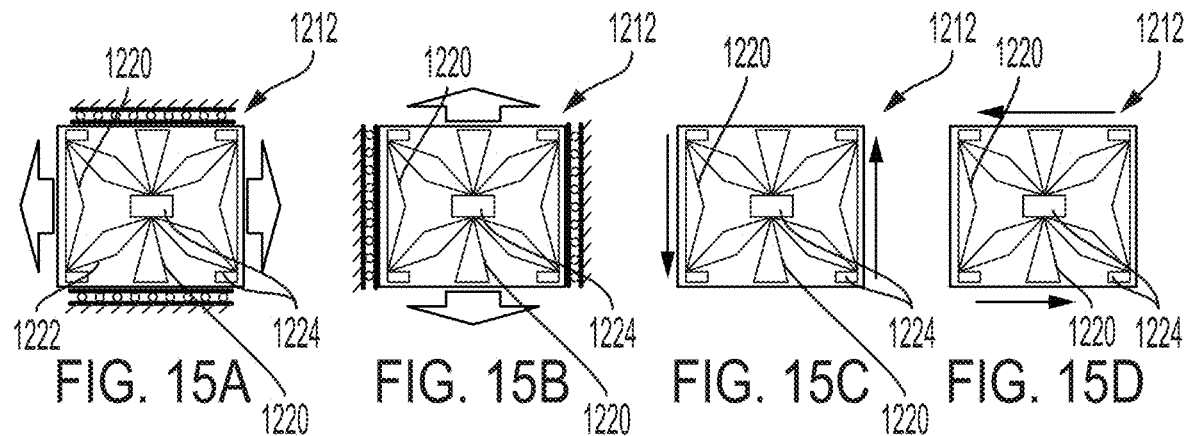
FIG. 15 is schematic illustration of homogenization of polar elastic metamaterials.

Referring now to FIG. 15 homogenization of the polar elastic metamaterials is shown. Part a shows uniform displacement fields applied for extension along horizontal direction; part b shows the same for extension along vertical direction; part shows the same for shear along vertical direction; and part d shows the same for shear along the horizontal direction.

In order to get the homogenized elasticity tensor(s), a unit cell 1212 of the polar elastic metamaterial is loaded, in simulation, with respect to different uniform displacement fields as shown in FIG. 15 via COMSOL-Multiphysics. In particular, as illustrated by FIG. 15 part a, a uniform horizontal displacement field is at the left and right boundaries of the unit cell while keeping the top and bottom boundary fixed vertically. The corresponding reaction forces at the left and right boundaries are collected to obtain the components of the elasticity effective tensor with respect to x-direction. Similarly, other components are determined by applying the uniform displacement boundaries illustrated by FIG. 15 parts b through d. As a comparison, the theoretical values and the numerical values of the homogenized effective properties are plotted in FIG. 16, in which a very good agreement is observed. Note that, as we mentioned in equation S6, due to the $c_{iijj}=c_{ijji}$, (i≠j), only one of these equal parameters, $c_{1122}$, is shown in FIG. 16.

Figure 16:
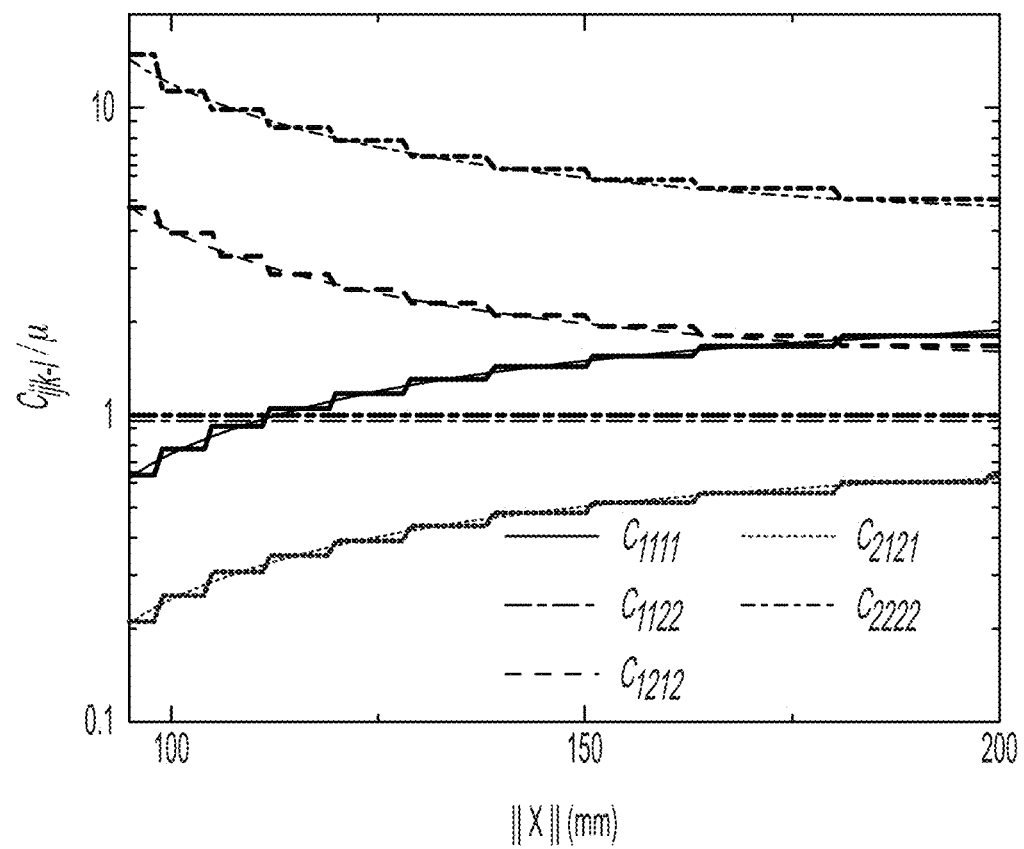
FIG. 16 illustrates, for a homogenization of polar elastic metamaterials, theoretical and numerical homogenized properties.

FIG. 16 shows homogenization of the polar elastic metamaterials. The dotted lines and the solid lines show the theoretical homogenized properties and the numerical homogenized properties respectively.

The following details simulation of a polar-mechanical metamaterial cloak according to the design and embodiment previously described.

Finite element analysis (FEA) using COMSOL Multiphysics was performed to simulate the performance of different cloaks under uniform tension and shear loading, which can be further adopted to design and optimize the disclosed polar-mechanical cloak.

Figure 17A:
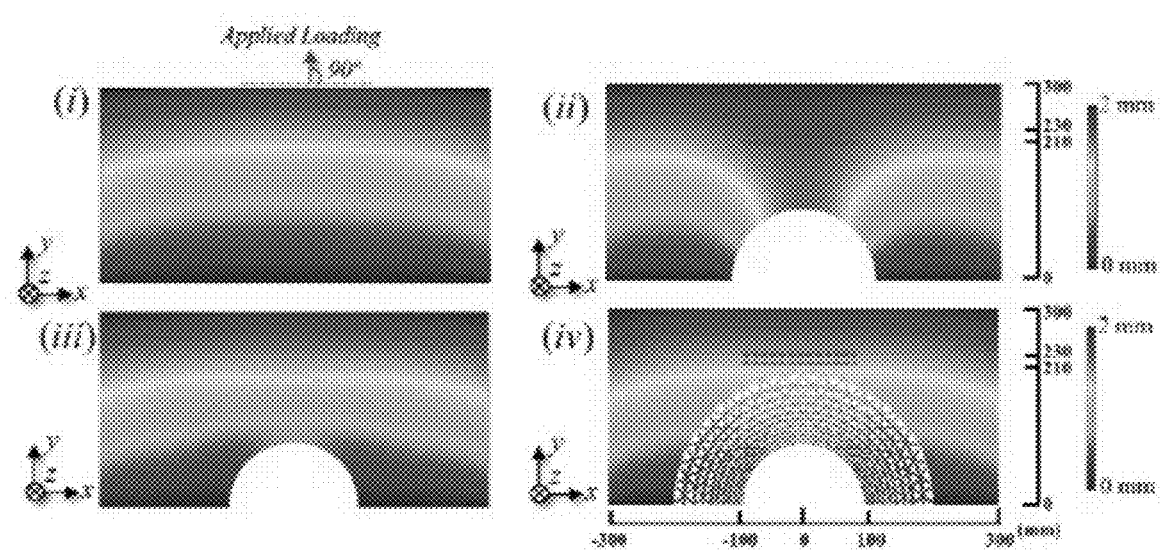
FIG. 17 illustrates numerical simulation and simulation results for a metamaterial cloak.
Figure 17B:
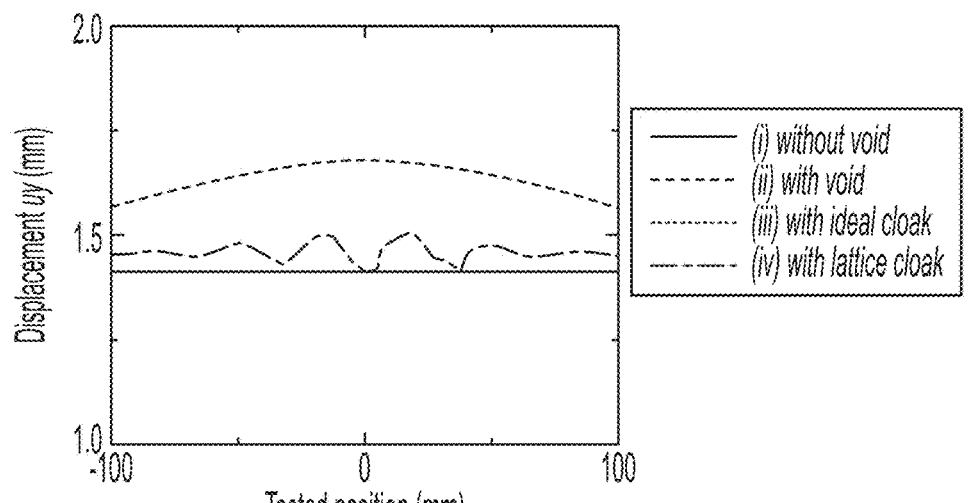
Figure 17C:
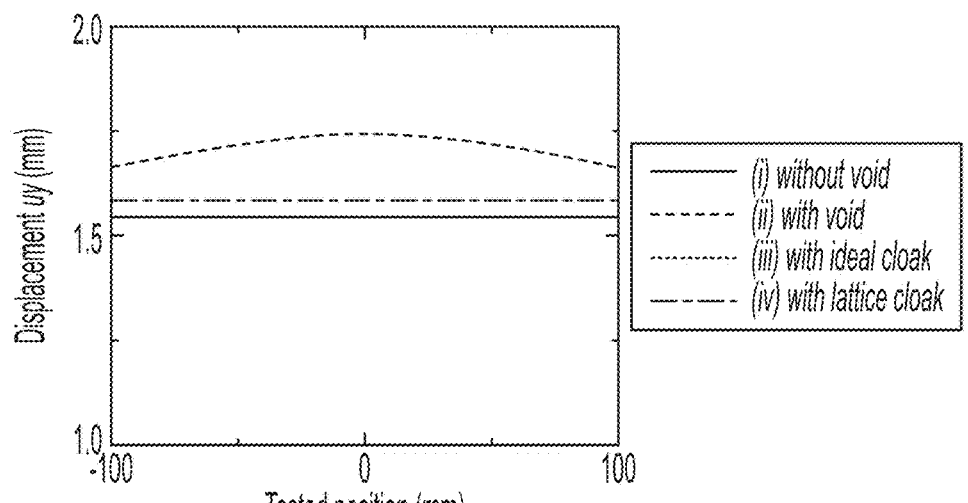

To be specific, for the tension loading case, plates without void, with void, with the cloak and with the proposed polar-mechanical cloak are simulated in parallel (c.f. FIG. 17 part a). Similar to the experimental setup, for the plates, all the displacement components of the bottom and the components in the horizontal plane of the top are fixed, while uniform vertical displacement along the y-direction is applied on the top and the left and right boundaries are free. The displacement $u_y$ of two horizontal lines dashed in red at distances of 210 mm and 230 mm from the bottom boundary, i.e., shown in FIG. 17 part a(iv), is considered. The corresponding simulated results are presented in FIG. 17 parts b and c respectively. The red dashed lines in FIG. 17 parts b and c corresponding to results of the plate with the void are much different from the others. Deviation between the result of the proposed design and the ideal response is not very large showing efficacy of the design method and cloak embodiments described herein. In addition, due to the local effect, the deviation at the distance of 210 mm is larger than that at the distance of 230 mm.

In additional detail, FIG. 17 shows the simulated displacement magnitude field under a uniform tension loading (red arrow at (i)) at the top boundary of the test plates: part a showing response (i) without void, (ii) with void, (iii) with the designed cloak, (iv) with the disclosed cloak embodiment. The displacement field along y-direction of the dotted lines of those plates (see (iv), from −100 mm to 100 mm along the x-axis) at distances of 210 mm and 230 mm from the bottom shown in parts b and c respectively.

Figure 18A:
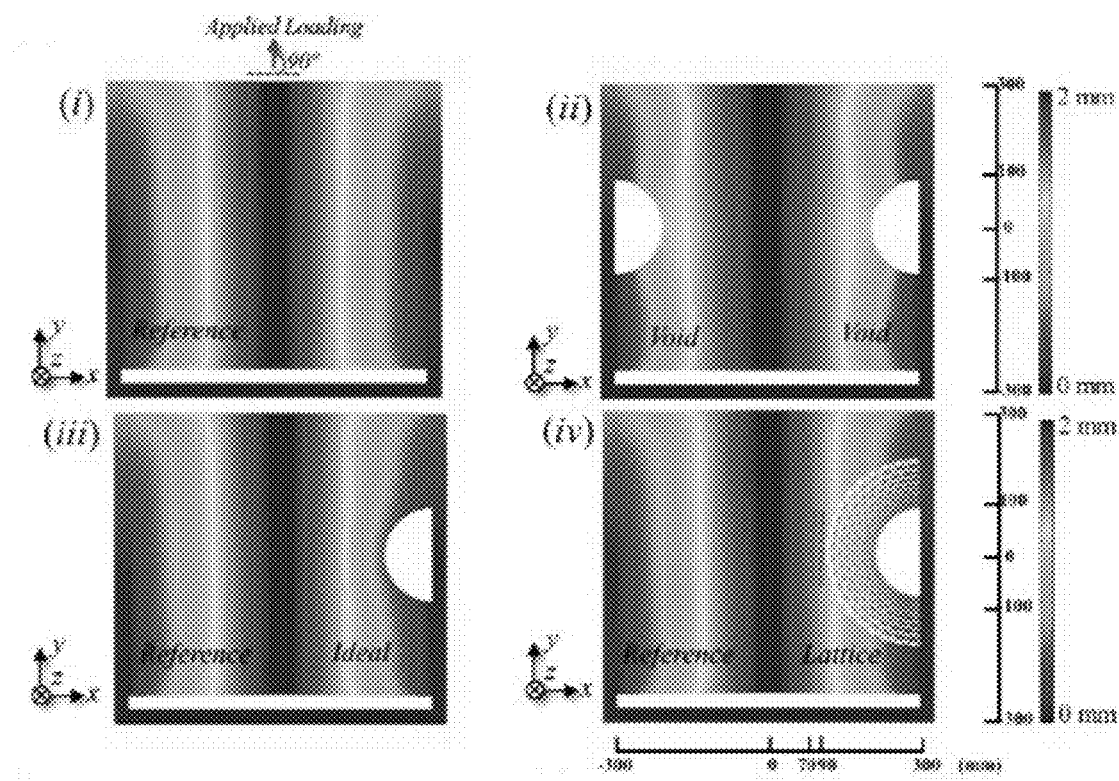
FIG. 18 illustrates additional numerical simulation and simulation results for a metamaterial cloak.
Figure 18B:
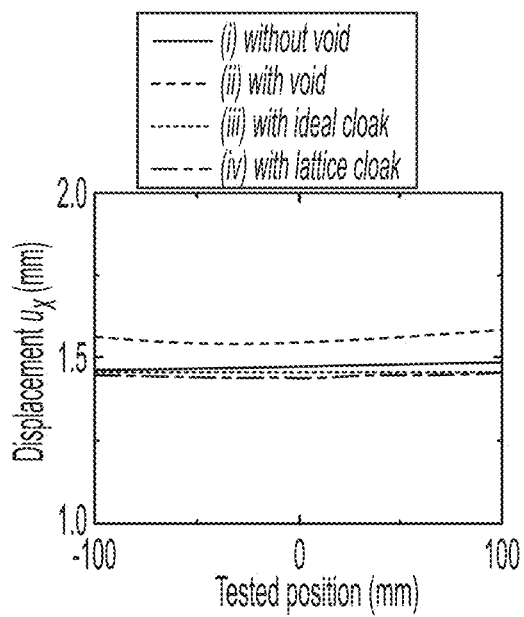
Figure 18C:
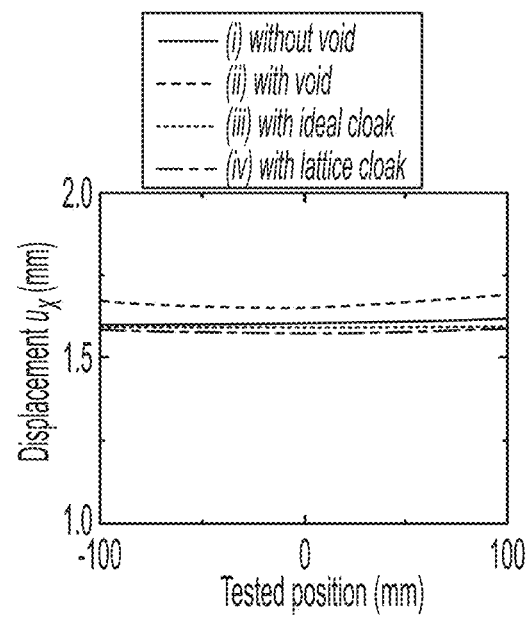

A holder frame carrying both the reference plate and the objective sample is modeled as shown in FIG. 18 part a. The displacement at lines at distances of 210 mm and 230 mm from the right boundary of the sample are studied. The corresponding displacement field along y-direction of all plates is extracted and shown in FIG. 18 parts b and c respectively. The response of the plate with the proposed cloak shows a good agreement with the result of the plate without defect. The FEM simulation under both tension and shear loading show satisfactory performance qualitatively with experimental results (e.g., as shown and discussed with reference to FIG. 10). In additional detail, FIG. 18 illustrates the simulated displacement magnitude field under a shear load (red arrow at (i)) of the plates: part a showing (i) without void, (ii) with void, (iii) with the ideal cloak, (iv) with the proposed cloak. The displacement field along y-direction at the dotted red lines shown in parts b and c respectively.

Figure 19A:
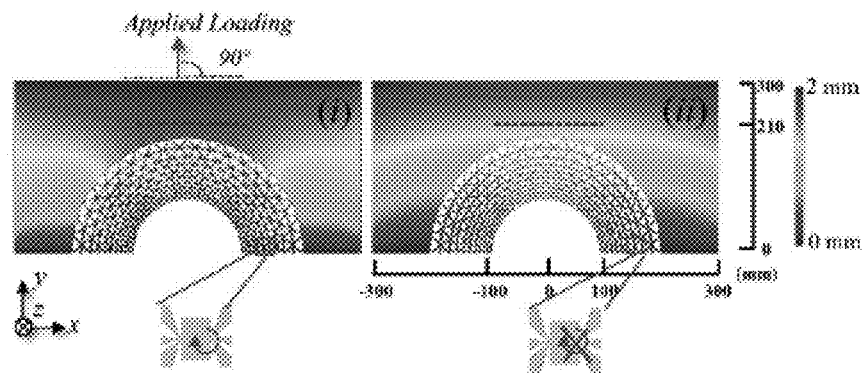
FIG. 19 illustrates additional numerical simulation and simulation results for a metamaterial cloak.
Figure 19B:
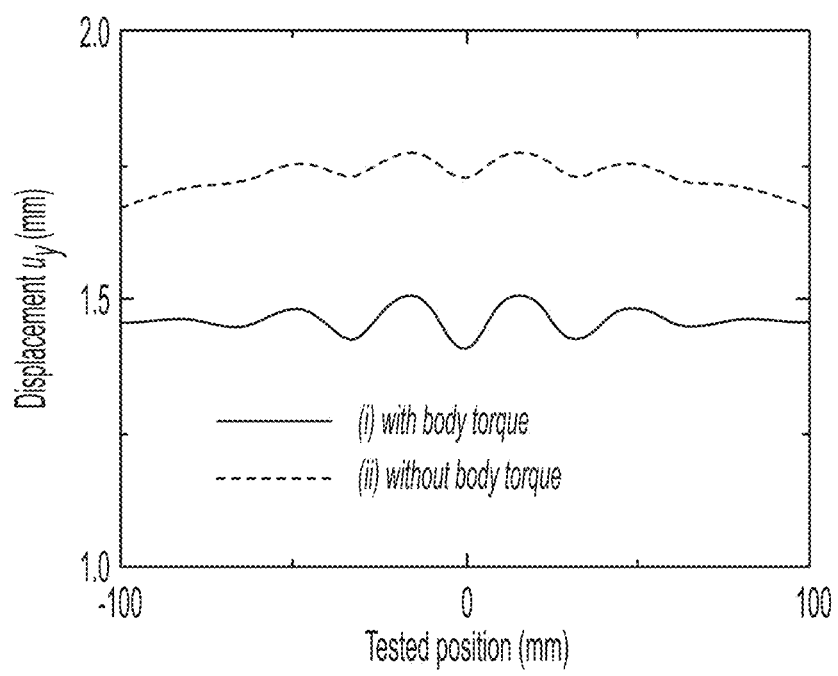

Without body torque transmitted in the proposed lattice, the cloak cannot block the void as shown in FIG. 19. This shows the importance of constraining torque. FIG. 19 illustrates, in part a, the simulated displacement field along y-direction under a tensile load at the top boundary of plates containing the proposed clock: (i) with body torque transmitted, (ii) without body torque transmitted, respectively. Part b shows the displacement field along y-direction at the dotted blue lines of the two cases in FIG. 18 part a.

From the preceding disclosure, it should be understood that the disclosed design methods and the cloak embodiments that these design methods and cloaks provide for cloaking of elastic waves and several advantages and use cases. The disclosed design methods and the cloak embodiments provide for modeling, design, and fabrication of degenerate torque materials for elastic wave control devices, and elastic cloaks in particular. The disclosed design methods and the cloak embodiments provide for unprecedented mechanical performance in chiral polar solids. Referring generally to the disclosure herein and specifically with reference to FIG. 20 part a, the polar solids discussed herein can exhibit chiral and handedness effects while remaining isotropic. Furthermore, referring generally to the disclosure herein and specifically with reference to FIG. 20 part b, the coupling between dilation and rotation precludes purely longitudinal and transverse wave propagation. Referring generally to the disclosure herein and specifically with reference to FIG. 21, based on rotational resonance a polar metamaterial, with no strings attached, is design as a passive solution which can be easily implemented in practical applications. In passive embodiments, the lattice structure of the cloak is attached to the ground or substrate directly (e.g., using rods coupling the masses to the ground/substrate individual) without providing for translation using the additional rail layers described herein. Alternatively, the passive embodiment is simply not attached to a ground. In any case, the passive solution allows for local rotation as seen in the detail view. Advantageously, the passive solution provides for a simpler structure in cloaking applications. However, such passive designs cannot accommodate the same range of wave frequencies as active solutions which include the rail system and/or other torque constraining systems while permitting translation. In passive, or active, systems it should be understood that the cloaks 2100 can be employed in an array 2101 or otherwise used in combination with additional cloaks 2100. Each cloak 2100, in this case circular cloaks, provides for a void 2103 in which the cloaking occurs (e.g., a circular void), the cloak being of lattice construction previously described herein (in the depicted case as a passive cloak without the rail system). Each cloak is coupled to surrounding cloaks using a connecting element 2105 (e.g., a spring element of the type previously described as an element of the lattice cloak). It is possible to construct a cloak made up of the array 2101 which in turn creates a cloaked void which each cloak individually and the array as a whole providing local and global, respectively, cloaking (e.g., as shown in FIG. 22). In such a case, the array 2101 forms a unit cell 2112 with each individual cloak 2100 acting as a mass and each connector 2105 acting as a spring in the case of a lattice cloak. In other words, FIG. 21 can be seen to illustrate the lattice structure of the cloak simply or as a composite of further individual cloak lattices.

Referring generally to the disclosure herein and specifically with reference to FIG. 22, a compact carpet cloak under which an object can be concealed can be designed and developed using the polar metamaterials described herein according to the design method described herein. Referring now to FIG. 23, cloaking using the cloak of FIG. 22 is demonstrated (e.g., showing displacement). The top half 2350 illustrates longitudinal wave/loading conditions while the bottom half 2352 illustrates shear wave/loading conditions. In each half, the top row 2354 illustrates an angled wave/loading condition while the bottom row illustrates 2356 illustrates a square wave/loading condition. The first, left to right, column illustrates a case with just the background material and no void or cloak, the second column illustrates the background material with a void but no cloak, the third column illustrates the expected design behavior of the cloak, and the fourth column illustrates the behavior of the cloak. As can be seen good cloaking is achieved.

In many embodiments, it will be desirable to use active cloaking and the structure shown and described with respect to FIGS. 9 and 12-13 employing a multi-layered structure designed for limiting the local rotations, while keeping translations intact. As previously explained (e.g., with reference to FIG. 10) such a structure has had its cloaking performance, under both pressure and shear loading, validated experimentally. The experiments confirmed the efficacy of the design method described herein using the discrete transformation theory described herein (e.g., with reference to FIG. 2). Per the disclosed design method, discrete transformation theory is developed under the framework of polar elasticity for the first time. The design method, cloak, and testing described herein has theoretically justified the fundamental need for the polar material by critically applying the discrete transformation method. The design method and resulting cloaks let the transformation gradient operate not only on the elastic properties but on the underlying architectures of the mechanical lattice. Anisotropic, chiral, and polar lattices have been formulated under the proposed discrete transformation elasticity. The design method and lattices described herein have provided microstructure realization of the lattice-based polar metamaterials for elastic cloaking and development of homogenization method (e.g., as described, at least in part, with reference to FIG. 4). The success of the method and cloaks developed has been verified using numerical validation (e.g., as describe in greater detail with reference to FIG. 5). Indeed, the cloak's behavior of the developed polar lattice-based metamaterial has been validated numerically for both longitudinal and shear waves with different incident angles. Lastly, the design methods and cloaks described herein have provided for unprecedented wave propagation in polar solids. With reference to FIG. 24 and as previously explained in general throughout, the isotropic polar platform can support omnidirectional polarization where the shear waves propagate faster with larger phase velocity than the longitudinal waves.

Referring now generally, to FIGS. 25-30 practical use cases employing the lattice cloak described herein are illustrated according to some exemplary embodiments. It should be understood that in each case the mechanical properties and geometries of the lattice structure of the cloak are selected according to the design method previously described, with the lattice and/or other cloak components generally having the characteristics and functions described previously.

Referring specifically to FIG. 25, three use cases of the lattice cloak are shown generally. In the first, left most, use case, the lattice cloak 2500 is used to cloak an object in the void 2013. As illustrated, the lattice cloak 2500 can take any shape to cloak and object of any shape (arbitrary or otherwise) by being appropriately designed using the design methods described herein. In the second, center, use case, the lattice cloak 2500 is used to realize mechanical wave harvesting by guiding the elastic waves into the center void 2503. In the third, use case, the lattice cloak 2500 is used as a waveguide for displacement filed control for shocking wave mitigation. Elastic waves can be constrained and directed into the void 2503 using the lattice cloak 2500.

Referring now to FIGS. 26 through 30, a specific use case for the lattice cloak 2600 is illustrated where the lattice cloak 2600 is used to cloak a vehicle 2660 axel and/or wheel hub from, for example, impact loading. The lattice cloak 2600 is used in a deformation-controlled polar lattice wheel 2662. The polar lattice wheel 2662 comprises a surface engaging material 2664 coupled to the outer most masses 2666 (relative to the center void 2603 and the axel/wheel hub connection) of the lattice cloak 2662. For example, the surface engaging material 2664 can be bonded, glued, adhered, have an interference fit with the lattice cloak 2600 or otherwise be coupled to the lattice cloak 2600. The surface engaging material 2664 can be any suitable material for interacting with a road surface. The surface engaging material 2664 can be rubber, polymer, or the like. In some embodiments, the surface engaging material 2664 is an air filled tire with the polar lattice wheel 2662 functioning in place of a traditional wheel. In such cases, the tire or the polar lattice wheel can include a surface for sealing with a traditional tire.

Still referring to FIG. 26, the lattice cloak 2600 of the polar lattice wheel 2662 comprises a plurality of polar unit cells 2612 with each unit cell 2612 being of the type previously described throughout (e.g., with respect to FIGS. 9 and 12). The unit cell 2612 comprises mass(es) 2624 coupled by spring elements 2616. The masses and spring elements are tuned in mechanical properties and geometry according to the design method described herein. In the depicted embodiment, the masses 2624 are coupled using large rhombus(es) 2620 and small rhombus(es) 2622 with the joints and rhombuses being of the type described with reference to FIG. 12 and having mechanical properties and geometries designed using the design method described herein. The unit cell 2612 has a torsion restraint (e.g., provided by a rod of the type previously described) and exhibits a zero mode, as depicted.

Referring now to FIG. 27, the polar lattice wheel 2662 us compared to a traditional wheel 2661 under impact loading conditions. With the polar lattice wheel 2662, the axel/wheel hub (e.g., where the wheel connects to the vehicle) 2668 is cloaked from the impact loading (e.g., including the elastic deformation wave induced by the impact loading). The lattice cloak 2600 cloaks the axel/wheel hub 2668 by positioning the connection with the axel/wheel hub 2668 inside the void 2603 of the lattice cloak 2600 and directing the impact loading/resulting elastic wave around and away from the axel/wheel hub 2668. In contrast, a traditional wheel under impact loading transfers the impact loading/resulting elastic wave to the axel/wheel hub 2667. Referring to FIG. 28, the unit cell 2612 including the large rhombus(es) 2622 which act as spring elements, can operate in a similar manner to a damper 2870 or a series of dampers 2870. Similarly the unit cell 2612 including the large rhombus(es) 2622 which act as spring elements, can operate in a similar manner to a flexible tire material which provides dampening. Thus, the polar lattice wheel 2662 provides additional benefits currently provided by existing dampers 2870 and tires 2872. In some embodiments, the polar lattice wheel 2662 can replace or reduce the need for dampers and/or dampening tire material. In some embodiments, a lattice cloak of the type described herein can replace or be used in tandem with traditional dampers or tires on a vehicle. Referring now to FIGS. 29 and 30, FIG. 29 shows and exploded view of the polar lattice wheel 2662 in relationship to an axel/wheel hub 2668 and FIG. 30 shows an end view of the polar lattice wheel. The polar lattice wheel 2662 is coupled to an axel/wheel hub 2668 using bolts 2680 which interface with corresponding threaded holes 2682 on the axel/wheel hub 2668. The polar lattice wheel includes a ground or substrate 2610 that attaches to the axel/wheel hub 2668 (e.g., by the bolts 2680). The lattice cloak 2600 is coupled to the ground or substrate portion 2610 by rods 2208 to limit rotation of the masses making up the lattice cloak 2600 (e.g., as explained in reference to FIG. 4). In some embodiments, the ground/substrate 2610 further includes a rail system of the type previously described with reference to FIGS. 9 and 12-13. In such a case, the rods 2208 connect the masses of the lattice layer to the top rail of the rail system. This allows for the lattice cloak 2600 to be constrained in rotation but allows for freedom in translation. Freedom in translation can be limited by stops incorporated into the bottom and/or top rails of the rail system. The polar lattice wheel 2662 can also include an inner hub portion 2682 coupled to the inner most masses of the lattice layer in a similar manner as that of the outer most masses and the surface engaging material 2664 (e.g., by adhesive, glue, welding, fasteners, etc.). The inner hub portion includes holes 2684 to accommodate the bolts 2680. The inner hub portion 2682 is within the void cloaked by the lattice cloak. By using a ground/substrate 2610 with holes and an inner hub portion 2682, the polar lattice wheel 2662 can replace a traditional wheel using the same bolt pattern. In some embodiments, the ground/substrate 2610 can be coupled to one another (e.g., using a cylindrical structure extending between the two and being positioned within the void cloaked by the lattice cloak). The polar lattice wheel 2662 provides for cloaking of the axel/wheel hub 2668, and therefore the rest of the vehicle, from impact loading and/or resulting elastic waves. This can reduce wear and tear on a vehicle because loading (dynamic and/or static) is reduced on other components using the cloaking effect described herein.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An elastic wave cloaking lattice-based metamaterial for cloaking an object within a void comprising:
   a lattice of connected unit cells arranged to form a void, each unit cell comprising a mass and a plurality of connecting springs, each mass coupled by the plurality of connecting springs to masses in adjacent unit cells, the plurality of connecting springs comprising at least two large springs of a first length and at least two short springs of a second length, the first length greater than the second length, the springs and masses having relational and mechanical characteristics to facilitate elastic wave cloaking in the totality of the lattice,
   wherein the lattice as a whole has metamaterial properties resulting from the positional relationship and mechanical properties of masses and connecting springs of the unit cells such that the lattice at least partially cloaks an object or material portioned within the void from elastic waves.

2. An elastic wave cloaking lattice-based metamaterial according to claim 1, wherein each mass has a first density and the plurality of springs have a second density the first density being greater than the second density.

3. An elastic wave cloaking lattice-based metamaterial according to claim 1 wherein the at least two large springs are rhomboid and the at least two short springs are rhomboid such that the plurality of connecting springs are coupled to masses at points where the connecting springs narrow from a maximum width at a location between masses.

4. An elastic wave cloaking lattice-based metamaterial according to claim 1 further comprising a plurality of rods, each rod extending from a corresponding mass and being adapted and configured to secure each mass to a ground or substrate and limit rotation of the mass.

5. An elastic wave cloaking lattice-based metamaterial according to claim 4 wherein each rod comprises at least one narrowed section near the end of each rod adapted and configured to be secured to the ground or substrate such that each narrowed section facilitates bending of the rod while limiting rotation of the mass.

6. An elastic wave cloaking lattice-based metamaterial according to claim 4 further comprising a rail system adapted and configured to allow for translation of the masses relative to a plane, the rail system comprising a top rail, a connector, and a bottom rail, the bottom rail being fixable to the plane and defining a first channel extending along a first direction, the connector being positionable within the first channel of the bottom rail and being slidable in the channel along the first direction, the top rail defining a second channel extending along a second direction perpendicular to the first direction, the connector being positionable within the second channel such that the top rail is slidable relative to the connector along the second direction, and wherein each rod is couplable to a top rail.

* * * * *